(12) United States Patent
Ifland

(10) Patent No.: US 12,101,363 B2
(45) Date of Patent: Sep. 24, 2024

(54) PROCESS TO DRIVE AND REINFORCE REMISSION STATUS

(71) Applicant: Food Addiction Reset LLC, Vashon, WA (US)

(72) Inventor: Joan Ifland, Seattle, WA (US)

(*) Notice: Subject to any disclaimer, the term of this patent is extended or adjusted under 35 U.S.C. 154(b) by 0 days.

(21) Appl. No.: 18/475,109

(22) Filed: Sep. 26, 2023

(65) Prior Publication Data

US 2024/0106876 A1 Mar. 28, 2024

Related U.S. Application Data

(60) Provisional application No. 63/377,117, filed on Sep. 26, 2022.

(51) Int. Cl.
*H04L 65/403* (2022.01)
*G06F 3/0482* (2013.01)

(52) U.S. Cl.
CPC .......... *H04L 65/403* (2013.01); *G06F 3/0482* (2013.01)

(58) Field of Classification Search
CPC .............................. H04L 65/403; G06F 3/0482
See application file for complete search history.

(56) References Cited

U.S. PATENT DOCUMENTS

| | | | |
|---|---|---|---|
| 2020/0142548 A1* | 5/2020 | Karunamuni | G06F 3/04842 |
| 2022/0374136 A1* | 11/2022 | Chang | G06F 3/04845 |
| 2023/0109946 A1* | 4/2023 | Minkel | G16H 20/00 705/2 |
| 2023/0111078 A1* | 4/2023 | Minkel | G16H 20/10 705/2 |

* cited by examiner

*Primary Examiner* — Benjamin M Thieu
(74) *Attorney, Agent, or Firm* — Rowan TELS LLC

(57) ABSTRACT

A system including a receiver to receive a set of user influences and a control system to prioritize a group of activation controls based on the set of user influences, send the group of activation controls to a client device to be displayed, each of the activation controls able to receive a first input to display one or more of a list of activities, videos, a food list, and further activation controls, and the activation controls further able to receive a second input to operate a video conferencing system on the client device.

7 Claims, 17 Drawing Sheets

PROCESS TO DRIVE AND REINFORCE REMISSION STATUS

CROSS-REFERENCE TO RELATED APPLICATIONS

This application claims the benefit of U.S. provisional patent application Ser. No. 63/377,117, filed on Sep. 26, 2022, the contents of which are incorporated herein by reference in their entirety.

BACKGROUND

Millions of Americans are on disability and a great many Americans die of diet-related diseases every year. A high percentage of Americans have at least one diet-related disease and are overweight or obese. They are unable to choose healthy foods, engage in physical activity, get good quality sleep, solve problems, socialize, and process emotions to maintain a positive attitude because their mirror neurons are copying unhealthy people and unhealthy commercial messaging. These gaps in behavior compound over time to create debilitating physical, mental, emotional, and behavioral diseases.

The American medical system is not working for millions of Americans. There are no effective methods to put diet- and stress-related diseases into remission. Weight loss, diabetes prevention programs, and mood disorder treatment tend to fail after a few years. The medical community in many cases does not provide effective methods to prevent the progression of diet- and stress-related diseases.

Pharmaceuticals, surgery, talk therapy, supplements, and physical therapy are the primary tools available to practitioners in clinics, hospitals, and rehabilitation facilities, however, these approaches are often not comprehensive enough to put diet- and stress-related diseases into remission. The general population may be unable to implement healthy food plans because they are surrounded by adverse influences of unhealthy people and commercial advertising of unhealthy products and activities. Further, medical services may be difficult to access and beyond the financial means of many Americans.

BRIEF SUMMARY

In one aspect, a method is disclosed that includes receiving a set of user influences to a receiver. The method also includes prioritizing a group of activation controls based on the set of user influences using a control system. The method also includes sending the group of activation controls to a client device to be displayed, each of the activation controls able to receive a first input from a user, where each of the activation controls is associated with a user-selectable content. The method also includes displaying the group of activation controls. The method also includes receiving the first input from the user to initiate the activation control to select the user-selectable content. The method also includes detecting patterns in initiation of the activation controls, where the patterns include selection of certain activation controls, lapse data, and specific activities. The method also includes providing the detected patterns as feedback to the control system to at least one of refine, simplify, streamline, and reduce the amount of data transferred to provide the user-selectable content to the user. The method also includes prioritizing future groups of activation controls based on the feedback.

In one aspect, a system is disclosed that includes a receiver and control system, the control system further including a processor and a memory. The memory stores instructions that, when executed by the processor, configure the disclosed system to perform the disclosed method.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
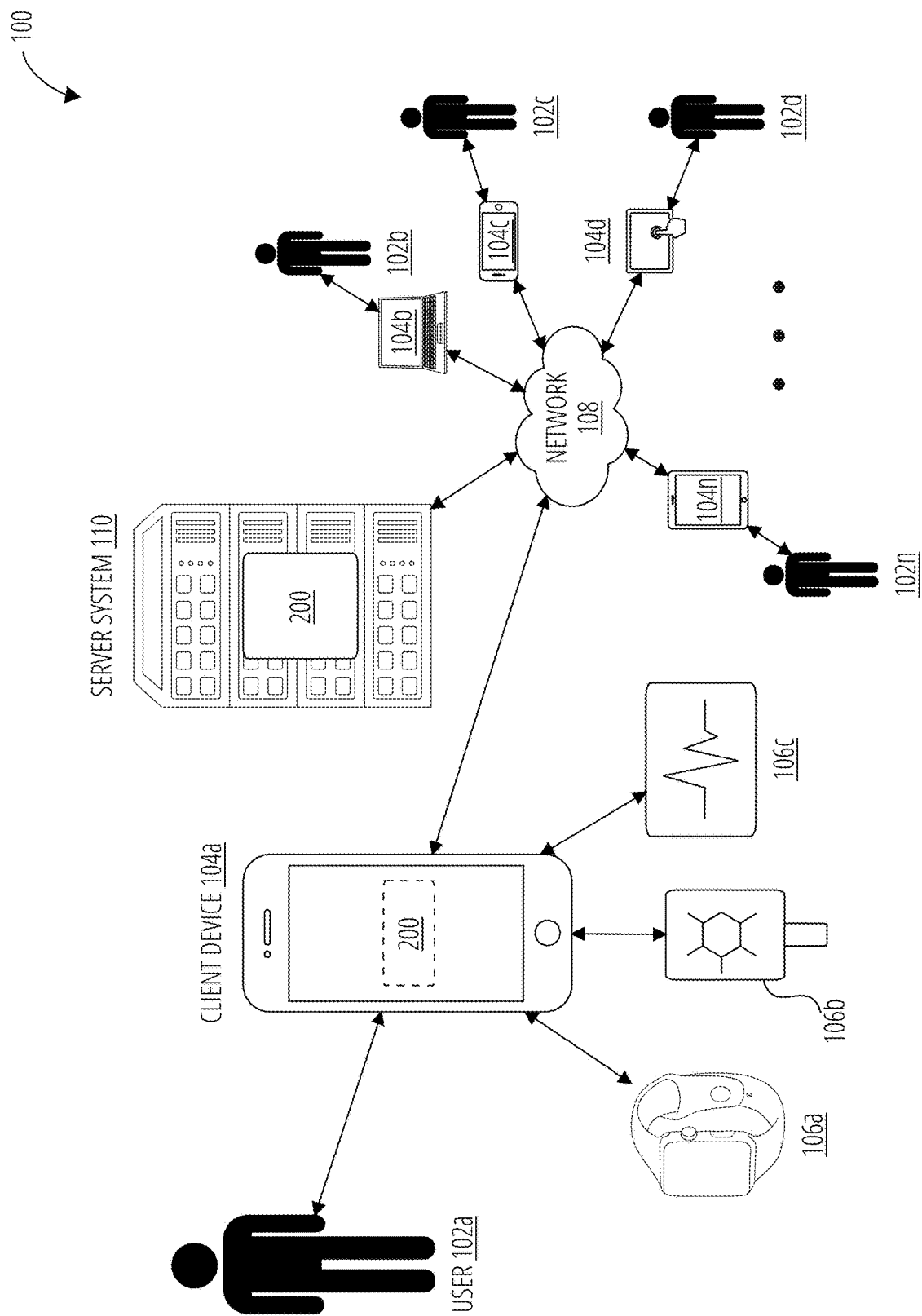
FIG. 1 illustrates an operating environment 100 in accordance with one embodiment.

Disclosed herein are processes and systems to transition a broad range of diet- and stress-related diseases into remission. The disclosed mechanisms are useful to prevent diseases as well as to place existing diseases into remission. The mechanisms may be applied to individuals, entire families, organizations, and/or physical communities such as towns and neighborhoods.

Five primary biomechanisms are engaged to effectuate these mechanisms:

A. Consistent and constant mirror neuron engagement with healthy people, replacing exposure to unhealthy people. Consistently exposing mirror neurons to healthy people overrides the urge to engage in unhealthy behaviors with the urge to copy healthy behaviors. The shift promotes health-restoring behaviors such as consistent high-quality sleep, healthy food, emotional processing, thought control, and physical activity.

B. Constant access to community triggers healthy regulation of vital biochemicals including:
1. Dopamine
2. Serotonin receptor
3. Serotonin transporter gene
4. Norepinephrine
5. Adrenal receptors
6. Adrenergic gene
7. Neuropeptide Y
8. Dehydroepiandrosterone (DHEA)
9. Cortisol
10. Cortico-releasing hormone (CRH)
11. CRH receptors C. Resolution of nutrition, stress, and environmental issues that impair cell function. Cell dysfunction includes oxidative stress, glycation, insulin resistance, mitochondria dysfunction, loss of autophagy, membrane integrity, epigenetics, and inflammation. Recovery of cell function manifests as remission of diseases throughout the body's systems including respiratory, cardiovascular/circulation, digestive, endocrine, urinary, reproductive, nervous/sensory, integumentary (skin), musculoskeletal, and blood/immune.

D. Pavlovian conditioning of neurons to regulate endogenous biochemicals to promote healing. Examples include higher oxytocin and opioid levels; better regulation of inflammatory proteins such as nuclear factor-kB; and lower chronic release of harmful hormones such as cortisol, adrenaline, and excessive insulin.

E. Resolution of diet-related diseases reduces the need for pharmaceuticals that have deleterious side effects.

The system effectuates mirror neuron engagement and Pavlovian conditioning of biochemicals by providing users with continuously available and immediate online access to peer-support communities. The system engages the user with a variety of easy-to-access online content to retrain brain cells to stimulate expert self-care and release helpful endogenous biochemicals. For example in one embodiment:

1. Specific training is provided by the system in a large number (e.g., over 100) of expert self-care skills.
2. The system generates positive messages to replace internal and external stressful messages that interfere with blood circulation as well as the healthy production of anti-inflammatory, anti-infection, and calming neurotransmitters, peptides, and hormones.
3. The system provides expert guidance in protecting against repetitive manipulative commercial triggering which conditions neurons to buy harmful products and services such as high-sugar/fat/salt foods, pharmaceuticals with damaging side effects, harmful weight-loss programs, and stressful entertainment.
4. The system engages the user with life management skills to solve painful problems that would otherwise lead to relapse into numbing substances and behaviors such as pharmaceuticals with harmful side effects, recreational drugs, unhealthy foods, and stressful media.
5. The system provides users with constant contact with communities, which operate as a defense against mood disorders, PTSD, and dementia. Each access to the communities causes releases of endogenous oxytocin that calms the user to prevent panic leading to harmful use of numbing substances and behaviors.
6. The system therefore provides an effective alternative to mirror neuron engagement with unhealthy people, especially in family, work, and social circles.
7. The system provides users with training in physical activity, meditation, breathwork, cognitive restoration, and other energy regulation modalities to promote the release of protective body chemicals.
8. Through the system, users engage with Small Private Messenger groups (e.g., 12 or fewer people) monitored throughout the day by a trained manager and assistants to promote closeness with a small group of other users and stronger mirror neuron engagement.
9. The system provides specialized Private Messenger Groups to meet specialized needs and promote mirror neuron engagement through informal connections with like-minded people. Examples of specialized groups include Men's, Christian, Girlfriends (people of color), LGBTQ, Serenity (Bulimia), Exercise/Movement, Writing, Arts & Craft, Teachers, Cross Addictions, Biracial Experience, Freedom From Clutter, Spanish Speaking, Conference Call Pod, Pet & Animal Park Pod, Knifty Knitters, Textbook Talk, Strength Pod, Body Acceptance, Travel, Raising Kids, and Financial Freedom.
10. Specialized Private Messenger Groups are provided for specific diseases.
11. The system provides support for enabling effective self-care available via one-on-one sessions with experts.
12. The system provides users with access to an online library of educational videos providing distraction from the temptation to neglect self-care or engage in unhealthy behaviors.
13. The system provides small (e.g., groups of five) teams for busy users to check in with to engage mirror neurons during short (e.g., 15-minute) sessions daily.
14. Users are given access to participate in healthful activities such as nature walks, karaoke, stories, educational videos, and music.

The system carries out Pavlovian conditioning of neurons through high levels of mirror neuron engagement with trained professionals who are already practicing expert self-care. The system provides continuous, low-latency access to live global video groups and conference calls staffed by live peer support trained in science, motivational interviewing, and deep compassion. The system augments video chats by providing continuous access to monitored Facebook groups, small Private Messenger Groups, twice-daily email, a daily podcast (recording of conference call), and an extensive library of engaging expert videos.

The continuous level of access sufficiently engages users' mirror neurons to copy the healthy, compassionate, positive users seen on their screen. The continuous programming shifts users away from copying unhealthy people in their physical environments and unhealthy behaviors found in stressful media and commercial messaging. By engaging mirror neurons, the system circumvents common mental barriers to expert self-care such as impaired cognitive function, hyperactive reward, and stress pathways, downregulated pleasure pathways as well as hyperactive food-seeking and fear-of-famine related to dieting.

Repeated high levels of engagement with people practicing expert self-care activate mirror neurons which in turn recondition neurons that have been habituated to harmful and neglectful behaviors. Easy continuous repeated access to new system conditioning over the Internet exposes the user to other users who are experts in self-care. This leads the user to manifest new effective self-care while gradually ceasing harmful, self-neglectful behaviors. High levels of consistent expert self-care put many diseases into remission through consistently healthy food, good sleep, positive self-regard, regular physical activity, positive thinking, emotion processing, relationship enhancement, socializing, and cognitive function.

In addition to mirror neuron engagement to develop expert self-care, some elements of the system operate in more focused ways to put specific diseases into remission. One example is musculoskeletal diseases.

The system is configured to operate to place diseases related to poor diet and chronic stress into remission. These include:
1. Physical conditions such as obesity, diabetes, high blood pressure, and heart disease.
2. Mental disorders such as attention deficit, learning difficulties, poor decision-making, poor problem-solving, memory loss, poor impulse control, dementia, and Alzheimer's. By partnering with medical providers, the system may also put more severe mental disorders such as schizophrenia and bipolar into remission.
3. Emotional disorders such as anxiety, depression, and irritability.
4. Behavioral issues such as isolation, disrupted sleep, relationship problems, aggression, and sedentary behavior.

System users join in online chats as much as their schedules permit. Users are trained in the four types of time, and how to incorporate healthy messaging into each type of time. The 'four types of time' as utilized in this description are:
1. When full attention is possible, the user watches their device (smartphone, tablet, laptop, computer) and participates in system activities.
2. When partial attention is possible, the user plays system programming in the background while they do something else. Mirror neurons are nonetheless actively being conditioned to choose healthy behaviors.
3. When a short snippet of time is available, the user may join in system activities for a few minutes to stimulate mirror neurons to activate the healthy control part of the brain and deactivate the unhealthy stress part of the brain.
4. When the user needs to pay full attention to something else, they may keep healthy mirror neurons activated by checking into the Facebook group or Private Messenger Group during breaks.

In addition to individuals, a system may be applied to help users of an organization such as a family, workplace, faith community, school, volunteer organization, health provider, etc. Towns, villages, and neighborhoods could also heal from diet- and stress-related diseases using the disclosed mechanisms.

Soon (e.g., within a day) of joining the system, a new user meets with a Manager to determine what kind of digital communication channels they already use frequently. The manager is trained in Motivational Interviewing, compassion, and science to connect with the user and activate mirror neurons. The Manager describes the messaging available over each digital channel such as video chat, email, Private Messenger, Facebook Group, podcast, and website.

The user works with their Manager to develop a schedule for the events they plan to attend. They collaborate on how the user may be comfortable joining the events by either just listening or participating. By offering the option to just listen, users may still meet the obligations of their lives while still getting neural rewiring to gravitate toward healthy behaviors. This innovation allows the extensive exposure needed to effectively stop the urge to engage in destructive behaviors and replace them with restorative behaviors.

The user engages in their preferred methods of digital communication and attends events. Through repeat messaging, mirror neurons are engaged, and neurons begin to respond by copying new thoughts, emotions, and behaviors that lead to better and better self-care.

The Manager monitors the user's activities through a daily attendance report.

After a few days, the user and Manager meet again. The Manager reviews how the user has been engaging to determine what is working and what could be improved. The Manager trains the user on any new digital communication channel that the user feels ready to use. Examples include how to log into the conference call or how to access the library. The Manager might also train the user to improve the use of existing technology such as finding emails that have gone to a trash folder.

The manager continues to monitor the user's comments in the Private Messenger Home Pod and answers any questions.

In the ensuing months, attendance is taken so Managers may monitor if a user's engagement is decreasing. The Manager meets with the user to collaborate on resolving any barriers to engaging in the system.

The Manager continues to work with users in the small Private Messenger Home Pods to celebrate progress, offer encouragement, and solve problems.

As each user learns new skills and stops harmful and neglectful behaviors, they become stronger physically, mentally, emotionally, and behaviorally. They're increasingly able to do harder things like set boundaries with household users, stop watching stressful media, keep their homes free from harmful foods, and resist temptations outside the home.

With each engagement in a system venue, users' mirror neurons observe and record the behaviors of other users. Mirror neurons decide who to copy based on how often they see people. Mirror neurons mimic what they observe and send messages to copy the observed behaviors into the parts of the brain that control the same behaviors as those being witnessed. By copying healthy content from increasingly familiar and friendly users of the system, each user gradually shifts behavior to a higher level of self-care. From frequent contact with very healthy people, consistent self-care routines are developed to such an expert level that diet- and stress-related diseases gradually go into remission.

By repeatedly observing healthy behaviors and acquiring specific self-care skills due to easy access to positive, skillful people throughout the day, users move towards new social norms of health. Mirror neurons are so sensitive and responsive to even small details, that mirror neurons may direct the body's systems to healthier functioning even without conscious awareness on the part of the user. Repeat exposure to healthy people conditions neurons to stay calm in all situations, listen with detachment to stressed people without stressing, establish healthy sleep times, control impulses, practice breathwork and meditations, engage in regular physical activity, enjoy self-respect and self-kindness, plan for and produce healthy foods, avoid triggers for unhealthy behaviors, etc. All of these improvements combined establish the foundation for strong health and the remission of a broad range of diseases.

The system may be adapted to be delivered to any family, any kind of organization or even to a physical community such as a town or neighborhood. By combining system education and example-setting with in-person events, the system could be even more effective when applied to communities where people already know each other and where mirror neurons are already trained to copy others.

Example Embodiment—Treatment of Processed Food Addiction

Processed food addicts chronically overeat processed foods, which leads to a range of consequences including obesity, diabetes, high blood pressure, cancer, fatigue, and depression. The addiction to processed foods is the loss of control over processed foods and is similar to the alcoholic who has lost control over alcohol.

Conventional industry techniques train people to abstain from problem foods as a way to stop obsessive cravings and loss of control. Processed food addiction is more complex than other addictions and may take a comprehensive, foundational approach to master food plans, trigger avoidance, and manage relationships. Conventional solutions do not provide a broad enough range of services to restore the extensive brain anomalies associated with processed food addiction. Those solutions may include addictive foods in the meal plan, provide inadequate training in trigger avoidance, fail to neutralize cues in the home environment, include requirements that are stressful (which triggers cravings), be too difficult to access, fail to provide enough access opportunities, demand too much too soon, fail to recognize that lapses are normal, fail to include cognitive restoration exercises and other energy regulation modalities, fail to address unhealthy sleep patterns, be expensive, or require travel.

The system presents a food plan that removes addictive foods. It is made available over a network to support ease of access, which increases effectiveness through repeat exposure. The system may also be executed on a portable device, further enabling access wherever a craving may occur. The system further allows a practitioner to access hundreds of members simultaneously to reduce cost and increase long-term accessibility for addicts. Long-term access is vital because addictions are permanently embedded in neurons' memory; thus, lifetime treatment is needed. The system may be utilized in the home; therefore, food addicts with disabilities or responsibilities do not have to travel. The home setting further allows for the neutralization of relapse cues associated with bingeing in the home. The system provides video chat, which engages mirror neurons often enough for members to associate the group with deep-seated survival instincts. This strongly fosters the motivation to do what the 'tribe' is doing, which overcomes resistance to taking important actions. The system also provides prompts to take essential actions, such as education, meditation, spiritual practices, healthy sleep, brain training, affirmations, intentions, exercise, and relationship management.

The system includes a stress-free environment engaging mirror neurons that allow and encourages members to try new behaviors without fear of negative consequences, flexible choice of enjoyable evidence-based recovery activities to promote engagement, education about the neurological basis of food addiction to reduce self-blame, frequent easy access to online communities to promote Pavlovian reconditioning of neurons, use of compassionate relationships to minimize the impact of childhood traumas, reduce cost of access to professional guidance to allow for long-term use, and training in cue-avoidance which are configured into website-based modules of activities and structured schedules, video chats, online discussion groups, conference calls, emails, and private message services. The system may be utilized by food addicts to build a program of protection against addictive loss of control over the use of processed foods.

FIG. 1 illustrates an operating environment 100 in accordance with one embodiment. The 100 may comprise users 102a-102n, client devices 104a-104n associated with each user, wearable sensors 106a-106c associated with a client device such as client device 104a as shown, a network 108, and a server system 110. The operating environment 100 may further comprise a system 200 as described in greater detail with respect to FIG. 2. The system 200 may in some embodiments reside wholly or in part within client devices 104a-104n, wholly or in part within server system 110, or within or across other storage platforms, as will be readily appreciated by one of ordinary skill in the art.

Each of users 102a-102n may provide inputs to their associated client device. These client devices 104a-104n may be mobile or stationary computing devices similar to that described with respect to FIG. 17, such as desktop computers, rackmount computers, in-car computers, game consoles, laptops or notebook computers, tablet computers, smartphones, e-readers, personal digital assistants or palmtop computers, programmable calculators, handheld game consoles, etc. As will be readily apprehended to one of ordinary skill in the art, more than one user may be associated with a particular client device, and each user may have multiple client devices they use to interact with the disclosed solution. User inputs to client devices may include haptic inputs, touchscreen inputs, text inputs, audio inputs, keyboard inputs, pointing device inputs, vision tracking inputs, video inputs, etc. These inputs may be associated with activation controls displayed by the client device as described in greater detail with respect to FIG. 2 and FIG. 4. The client device may then utilize logic to determine selections made by the user and the corresponding response.

In some embodiments, the client devices may be in communication with other devices such as the wearable sensors 106a-106c associated with client device 104a as shown. These wearable sensors may be worn by the user 102a and thus may provide wellness and activity data that may be utilized in the disclosed system. For example, wearable sensor 106a may be a fitness tracker or smartwatch equipped with fitness and activity-related sensors and may be capable of indicating the activity or health states of user 102a throughout a tracking time period. Such data may include distance traveled, steps taken, heart rate, etc., which may be transmitted to client device 104a, and thence to the disclosed system 200, where it may be used to refine suggestions for physical activity offered by the disclosed system to user 102a. Wearable sensor 106a may be capable of interpreting data sensed from user 102a to determine the quantity and quality of sleep experienced by user 102a, which may be transmitted via client device 104a to system 200, for use in refining activity, food, and rest suggestions. Wearable sensor 106b may be a glycosometer capable of periodically or continuously monitoring a blood sugar level for user 102a. Such data may similarly be relayed to system 200 through client device 104a, and may be used to refine food list suggestions, trigger visual, audible, or haptic warnings via client device 104a, etc. Wearable sensor 106c may be a portable heart rate monitor in communication with client device 104a, and heart rate data for user 102a may be related to the disclosed system and used accordingly. These examples are provided for illustrative purposes and are not intended to limit the scope of this disclosure. It will be readily understood by one of one of ordinary skill in the art that other similar sensors known at this time or developed in future may be integrated into operating environment 100, such integration being most easily accomplished through, but not limited to, communication with a client device or integration within a client device.

Each client device may communicate with the other client devices or the server system 110 via the network 108. These communications may include utilizing web browsers, email systems, video conferencing systems, telecommunication systems, blogging logic, etc., such as are described in greater detail with respect to FIG. 4. The server system 110 may include cloud-based or computer-based systems that include storage of information to be accessed by the client devices as well as the disclosed control system 206 of FIG. 2, which may then determine the display of each client device. The client devices 104a-104n, in some embodiments, may include the control system and utilize the network 108 and the server system 110 to send and receive control signals.

Figure 2:
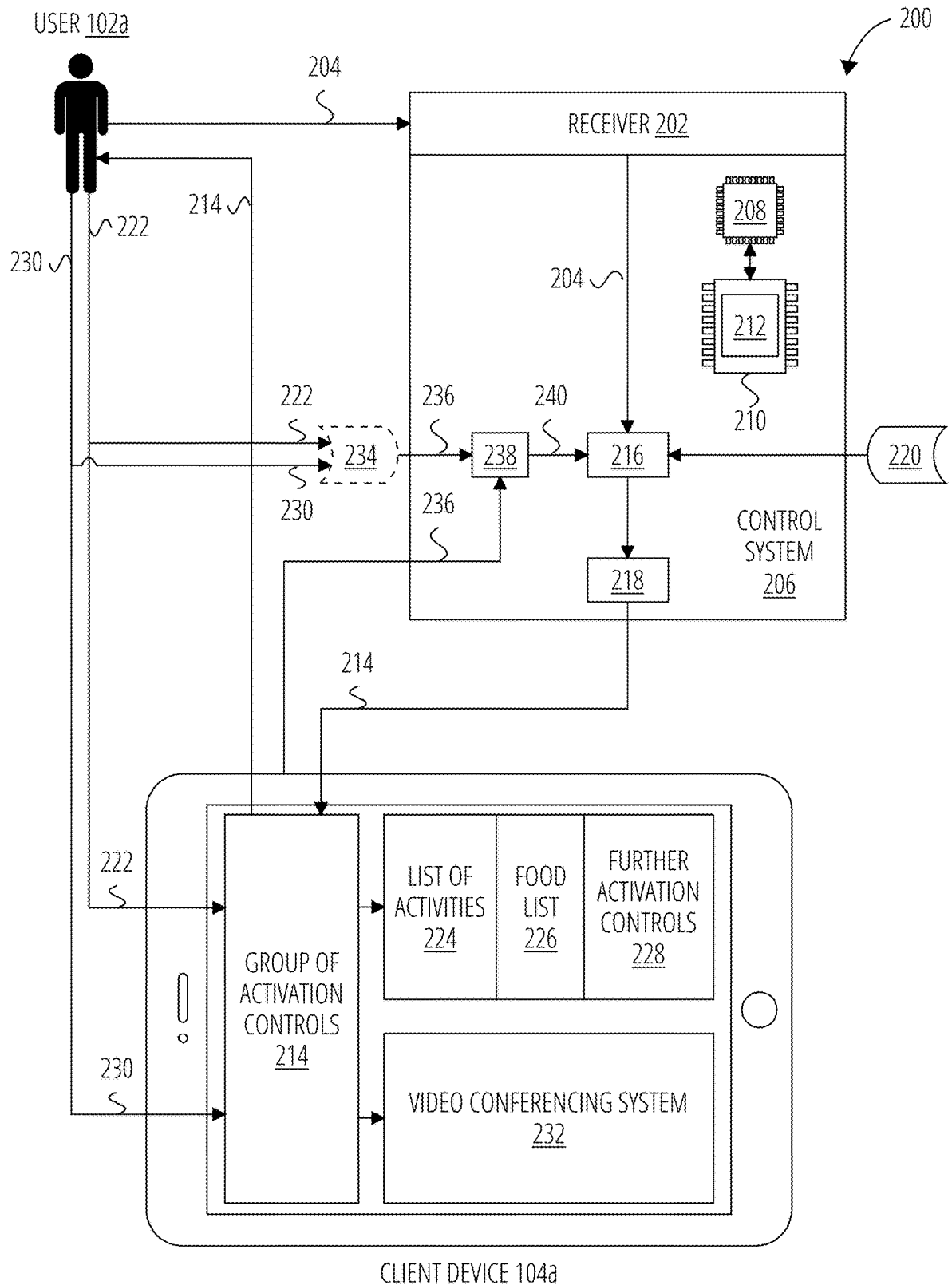
FIG. 2 illustrates a system 200 in accordance with one embodiment.

FIG. 2 illustrates a system 200 in accordance with one embodiment. The system 200 comprises a user 102a, a client device 104a, a receiver 202, a set of user influences 204, a control system 206, a processor 208, a memory 210, instructions 212, a group of activation controls 214, prioritization logic 216, sending logic 218, an activation control 220, a first input 222, a list of activities 224, a food list 226, further activation controls 228, a second input 230, a video conferencing system 232, a user preference control memory structure 234, activation control initiation data 236, pattern detection logic 238, and detected patterns 240. The system 200 as disclosed is configured to perform routine 300 as illustrated in and described with respect to FIG. 3. The system 200 may be additionally configured to act as the food addiction treatment system 400 illustrated in and described with respect to FIG. 4.

Figure 3:
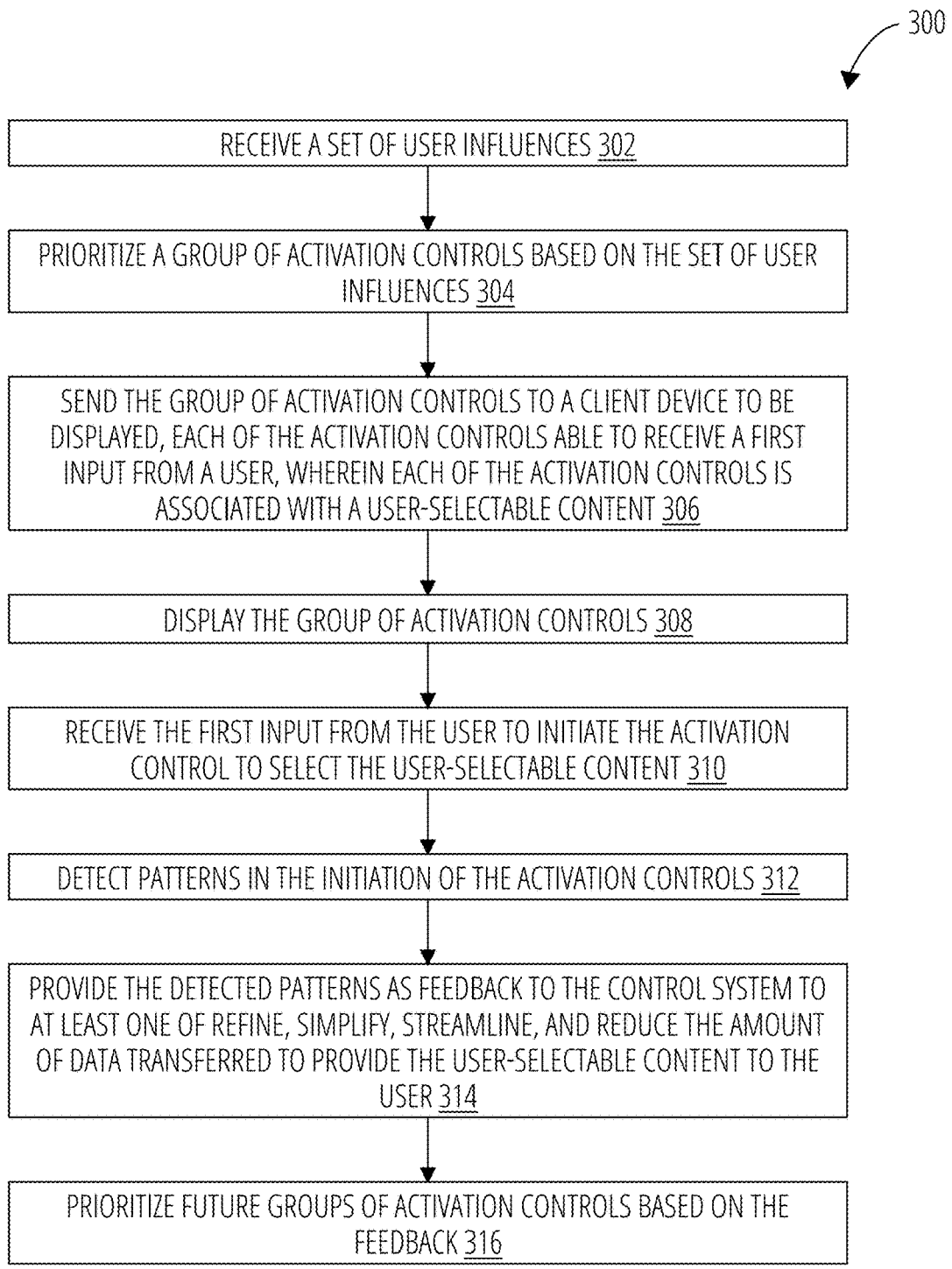
FIG. 3 illustrates an aspect of the subject matter in accordance with one embodiment.

FIG. 3 illustrates an example routine 300 that may be performed by the disclosed system 200 or food addiction treatment system 400. Although the example routine 300 depicts a particular sequence of operations, the sequence may be altered without departing from the scope of the present disclosure. For example, some of the operations depicted may be performed in parallel or in a different sequence that does not materially affect the function of the routine 300. In other examples, different components of an example device or system that implements the routine 300 may perform functions at substantially the same time or in a specific sequence.

According to some examples, the method includes receiving a set of user influences at block 302. For example, receiver 202 illustrated in FIG. 2 may receive a set of user influences. In one embodiment, the set of user influences 204 may be provided by a user 102a interacting with a web-based form or application. This form or application may be configured as the receiver 202. In one embodiment, the receiver 202 may be configured as an application stored on the user's client device 104a.

According to some examples, the method includes prioritizing a group of activation controls based on the set of user influences at block 304. For example, the prioritization logic 216 illustrated in FIG. 2 may prioritize a group of activation controls based on the set of user influences 204. The group of activation controls may include at least one of a control to display a list of activities, a control to display a food list, and a control to display further activation controls.

According to some examples, the method includes sending the group of activation controls to a client device to be displayed, each of the activation controls able to receive a first input from a user, wherein each of the activation controls is associated with user-selectable content at block 306. For example, the sending logic 218 illustrated in FIG. 2 may send the group of activation controls to a client device to be displayed, each of the activation controls able to receive a first input from a user, wherein each of the activation controls is associated with a user-selectable content. In one embodiment, the group of activation controls may be provided through access to a website 406. In one embodiment, the group of activation controls may be sent as a set of links in an email through an email system 408. In another embodiment, blogging logic 412 may be used to provide activation controls as described with respect to FIG. 4.

According to some examples, the method includes displaying the group of activation controls at block 308. For example, the client device 104a illustrated in FIG. 1 may display the group of activation controls. The client device 104a and its interactions with the user 102a and control system 206 are described in greater detail with respect to FIG. 1 and FIG. 4.

According to some examples, the method includes receiving the first input from the user to initiate the activation control to select the user-selectable content at block 310. For example, the group of activation controls 214 illustrated in FIG. 2 may receive the first input from the user to initiate the activation control to select the user-selectable content. The group of activation controls may further be able to receive a second input to operate a video conferencing system on the client device, which may communicate with the audio/video conferencing system 410 of FIG. 4. The control system 206 may in one embodiment receive a time from a timer 420 as described with respect to FIG. 4 and may utilize the time to further prioritize the group of activation controls. In one embodiment, a control to operate a video conferencing system among the group of activation controls may be deactivated based on the time provided by the timer.

According to some examples, the method includes detecting patterns in the initiation of the activation controls at block 312. For example, the control system 206 illustrated in FIG. 2 may use pattern detection logic 238 to detect patterns in the initiation of the activation controls. In one embodiment, a user preference control memory structure may store instances of the first input and the second input and may provide these as activation control initiation data that the control system 206 and its prioritization logic 216 may use to prioritize future groups of activation controls 214. Patterns in the initiation of the activation controls may include user selection of certain activation controls, laps data, and other specific activities indicated by or inferred from the user's interaction with the disclosed system.

According to some examples, the method includes providing the detected patterns as feedback to the control system to at least one of refine, simplify, streamline, and reduce the amount of data transferred to provide the user-selectable content to the user at block 314. For example, the pattern detection logic 238 illustrated in FIG. 2 may provide the detected patterns as feedback to the control system to at least one of refine, simplify, streamline, and reduce the amount of data transferred to provide the user-selectable content to the user.

According to some examples, the method includes prioritizing future groups of activation controls based on the feedback at block 316. For example, the control system 206 illustrated in FIG. 2 may prioritize future groups of activation controls based on the feedback. By detecting patterns in the user's initiation of activation controls, the system may improve and refine its efficiency and efficacy by providing more intelligently targeted data to the user over time, reducing the body of content the system considers and transmits, thus improving its processing bandwidth, communication bandwidth, and response time.

Figure 4:
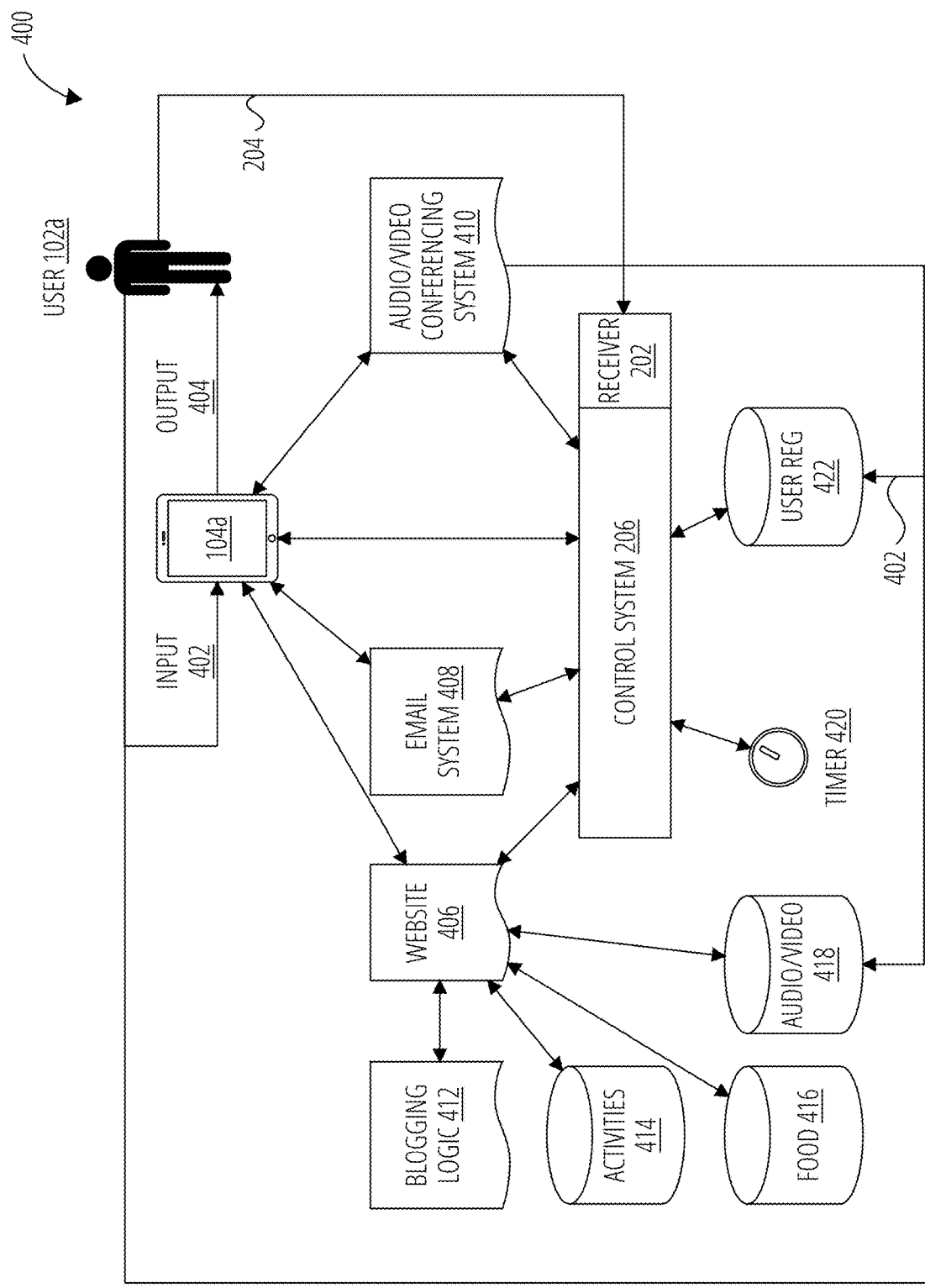
FIG. 4 illustrates a food addiction treatment system 400 in accordance with one embodiment.

FIG. 4 illustrates a food addiction treatment system 400 in accordance with one embodiment. The food addiction treatment system 400 may comprise a user 102a, a client device 104a, a receiver 202, a set of user influences 204, a control system 206, a website 406, an email system 408, an audio/video conferencing system 410, a blogging logic 412, an activities control memory structure 414, a food control memory structure 416, an audio/video control memory structure 418, a timer 420, a user registration control memory structure 422, an input 402, and an output 404. The system 200 may be configured to act as the food addiction treatment system 400 as described below.

The client device 104a may receive inputs 402 that may be utilized by the food addiction treatment system 400 to alter the outputs 404 of the client device 104a. Inputs 402 may include text entry or user interface selections made by a user 102a through controls displayed on the client device 104a, visual data captured by the user using the client device 104a camera or other camera device, audio data captured by the user 102a through the client device 104a microphone or other sound detecting device, touch or haptic data voluntarily generated by the user 102a, or other sensor data such as may be detected by the wearable sensors described with respect to FIG. 1.

The client device 104a may, as one example of outputs 404, display activation controls as described with respect to FIG. 2 and FIG. 3. When an associated input 402 is received, the activation controls may alter the operation of the client device 104a. The activation controls may also be associated with the website 406, the email system 408, and the audio/video conferencing system 410. Output 404 may in some embodiments also include haptic and audio signals or alerts, other visual notifications and alerts. It is recognized in the art that mirror neuron firing may also be influenced by sound. Audio outputs 404 may be used to reinforce habits under formation through visual stimuli.

The website 406 sends and receives control signals to and from the client device 104a to alter the operation of the client device 104a. The website 406 also interacts with a control system 206 to alter the content, such as activation controls, lists, etc. The website 406 may operate with the blogging logic 412 to display a list of conversations on the client device 104a. The activities control memory structure 414 and the food control memory structure 416 may be accessed by the website 406 to alter the content displayed by the website 406 on the client device 104a. Information from the activities control memory structure 414 and the food control memory structure 416 may also be displayed on the client device 104a in response to the selection of an activation control on the display of the client device 104a. For example, the website 406 may display an activation control for the client device 104a to operate to display a video when selected. The website 406 is configured by the control system 206 to display content based on the user registration control memory structure 422. A credential may be input to the client device 104a to determine the user in the user registration control memory structure 422. The website 406 may then be reconfigured by the control system 206 to display the activation controls associated with the user identified in the user registration control memory structure 422.

The email system 408 sends and receives emails from the client device 104a. The email system 408 may embed links that operate as activation controls to operate the client device 104a to communicate with the website 406 and the audio/video conferencing system 410. The email system 408 may be influenced by the control system 206. For example, the control system 206 may influence the email system 408 to send a different email based on a self-quiz received at the website 406 and subsequently sent to the control system 206 to determine how to influence the email system 408.

The audio/video conferencing system 410 communicates with the client device 104a to operate the client device 104a to connect to an audio conference or video conference, which may include one or more other client devices. The client device 104a may access the audio/video conferencing system 410 by activating an activation control displayed on the client device 104a by the website 406 or the email system 408. The audio/video conferencing system 410 may also be accessible as determined by the control system 206 based on the timer 420. The audio/video conferencing system 410 records and sends the video or audio to the audio/video control memory structure 418, which may then be displayed on the website 406 or, an activation control to access the video or audio recording may be displayed.

The control system 206 communicates with the website 406, the email system 408, and the audio/video conferencing system 410 to influence their display, actions, and accessibility. The control system 206 may, for example, influence the website 406 to display specific information and activation controls from the activities control memory structure 414, the food control memory structure 416, and the audio/video control memory structure 418, in a prioritized fashion. The control system 206 may also communicate with the timer 420 to determine when to influence the other system, for example, by controlling access to the audio/video conferencing system 410. The control system 206 communicates with the user registration control memory structure 422 to influence the website 406, the email system 408, and the audio/video conferencing system 410 based on a specific user operating a client device 104a. For example, the client device 104a may receive instances of input specific to a particular user and is transmitted through the website 406 to the control system 206. The control system 206 then accesses the user registration control memory structure 422 for the specific user and influence the information and activation controls displayed by the website 406 for that specific user operating the client device 104a.

The blogging logic 412 communicates with the website 406 to alter the website 406 to display text output from the blogging logic 412. The blogging logic 412 may include logic to automatically respond to an input from the website 406. The blogging logic 412 may also influence another device connected via the website 406 to provide an input to the blogging logic 412. The blogging logic 412 may alter a client device 104a to display the text input or a portion thereof on the display of one of the client device 104a to respond. The blogging logic 412 further determines the location and size of such the text input to influence a response. The location and size may be altered by the blogging logic 412 over time. For example, if predetermined periods of time elapse without indication that the user has interacted with the text input, incremental changes in size and location may be made to bring the text input into greater visual prominence.

The activities control memory structure 414 stores lists of activities that may be displayed by the website 406 on the client device 104a. The list may also include associated video and/or audio files or may be associated with the audio and video files stored in the audio/video control memory structure 418. The activities may include exercises, meditations, sleep modules, food module, food addiction learning modules, etc. The activities displayed, or the order of the display, or arrangement of the display, may be influenced by the user of the client device 104a, time of day based on the timer 420, completed activities over a time period, such as a day, part of a day, week, hour, etc. The list of activities may further be influenced by various inputs to the client device 104a, such as audio recording of stated preference associated with a user, a reporting of specific activities, such as a lapse, a detected pattern of activation of certain activation controls, etc. Such refinements may allow the disclosed solution to represent a significant technical improvement over conventional systems providing content to a user. At high data-transfer volumes, it may not only be deleterious to a user's continued attention and focus to overload them with less pertinent data, such that the user has to sift that volume to find what is most beneficial to themselves, it may also represent a significant impact on wired or wireless signaling bandwidth and data storage. Feedback comprising the detected pattern of activation of certain activation controls, lapse data, and specific activities may be used to refine, simplify, streamline, and reduce overall the amount of data transferred for output to the user, improving not only the efficacy of the system but the performance of the hardware involved in its implementation. In addition to improving efficiency and efficacy of the system, improved targeting of data transferred to the user may allow users with less expensive, lower data smartphone plans may be better accommodated by a system that more lightly impacts their smartphone data utilization.

The food control memory structure 416 stores lists of foods, which may be pre-arranged. The list may depict a food generally (e.g., protein) or specifically (e.g., eggs). The lists of foods displayed by the website 406 on the client device 104a may be influenced by the user of the client device 104a, time of day based on the timer 420, selections of activation controls associated with the food lists over a time period, such as a day, part of a day, week, hour, etc. The list of foods may further be influenced by various inputs to the client device 104a, such as audio recording of stated preference associated with a user, a reporting of specific activities, such as a lapse, a detected pattern of activation of certain activation controls, etc.

The audio/video control memory structure 418 stores recording of audio and/or video files. The audio or video files may be received from the audio/video conferencing system 410. The audio/video files displayed on the client device 104a may be influenced by the activities list and food list displayed on the client device 104a. The audio/video files displayed by the website 406 on the client device 104a may also be influenced by the user of the client device 104a, time of day based on the timer 420, selected activation controls associated with audio/video files over a time period, such as a day, part of a day, week, hour, etc. The list of foods may further be influenced by various inputs to the client device 104a, such as audio recording of stated preference associated with a user, a reporting of specific activities, such as a lapse, a detected pattern of activation of certain activation controls, etc.

The timer 420 is utilized to determine a current time, which may be associated with the performance of activities by the control system 206 to influence the website 406, the email system 408, and the audio/video conferencing system 410. The timer 420 may be utilized to determine when specific activation controls are selected, time between selection of activation controls, when to display activation controls, etc.

The user registration control memory structure 422 stores information associated with one or more users. The user registration control memory structure 422 may store information to associate a user with one or more of the client devices. The user registration control memory structure 422 may store a record of the activation controls selected, the time of the selection of those controls, the reporting of various activities, such as lapses, etc. The stored information may be communicated to the control system 206 to influence the control of the website 406, the email system 408, and the audio/video conferencing system 410 for each client device 104a associated with a user. The user registration control memory structure 422 may act as the user preference control memory structure 234 illustrated in FIG. 2. As previously described, storing such information and feeding it back to the control system 206 may allow the disclosed solution to represent a significant technical improvement over conventional systems providing content to a user. Such feedback comprising may be used to refine, simplify, streamline, and reduce overall the amount of data transferred for output to the user, improving not only the efficacy of the system but the performance of the hardware involved in its implementation.

Figure 5:
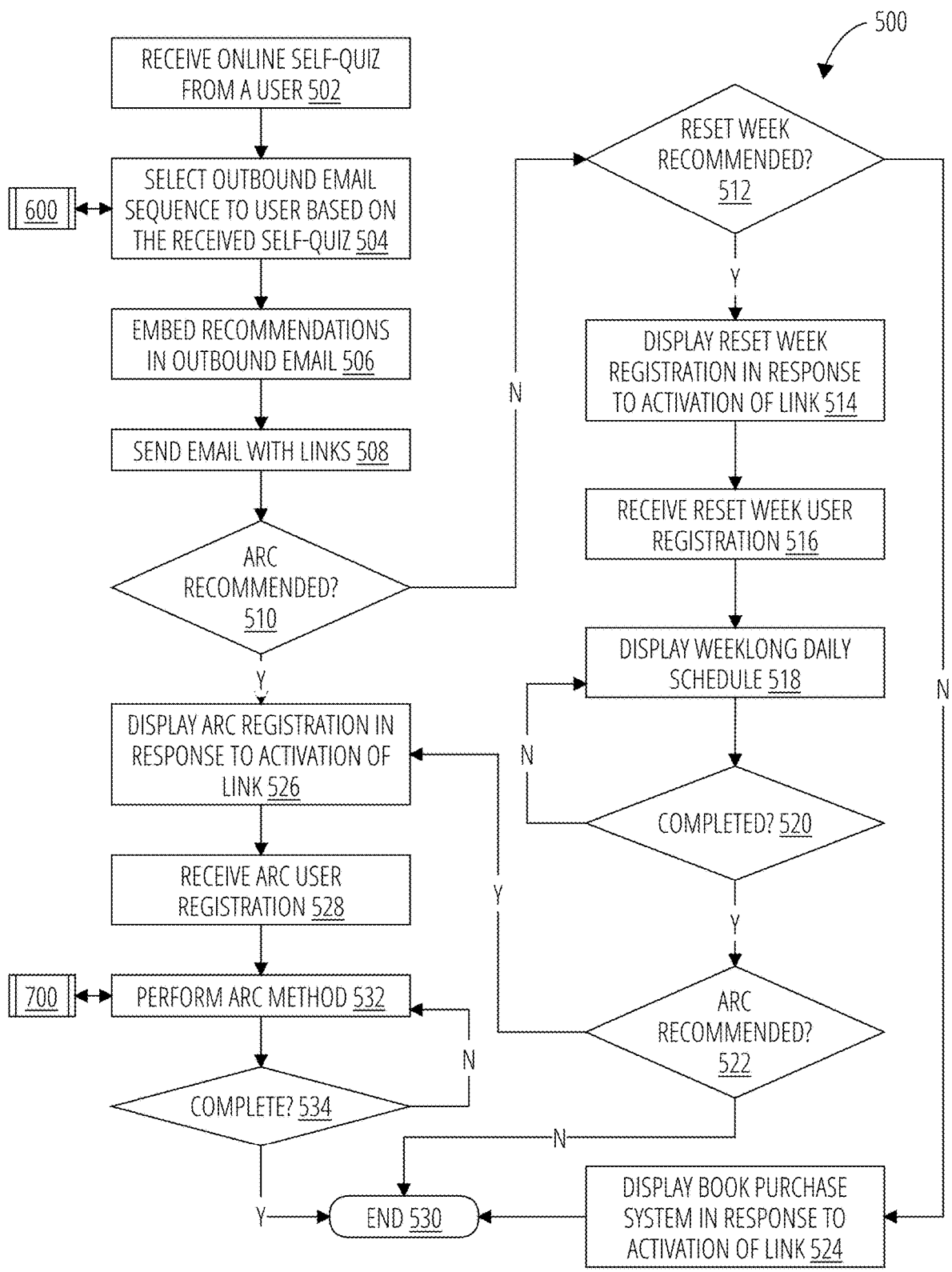
FIG. 5 illustrates a food addiction treatment method 500 in accordance with one embodiment.

Referring to FIG. 5, a food addiction treatment method 500 receives an online self-quiz from a user (block 502). The user may receive the self-quiz from sales material by online video, The Facebook® post, email, etc. and may include descriptions of new research. Additionally, the user may be given the option to take a self-quiz showing how severe their food addiction is or what benefit they might get from recovery. An outbound email sequence is selected to be sent to the user based on the received self-quiz (block 504). This process may be performed in accordance with the self-quiz subroutine 600 depicted in FIG. 6. Recommendations are then embedded into the outbound email (block 506). The email with links is sent (block 508). The food addiction treatment method 500 determines whether the Accomplish Reliable Control (ARC) and successor organization methods were recommended (decision block 510).

If the ARC and successor organization methods were not recommended, the food addiction treatment method 500 determines whether the Reset Week and successor organization methods were recommended (decision block 512). If so, the Reset Week and successor organization registration is displayed in response to activation of the email link (block 514). This registration is then received (block 516). A week-long daily schedule is then displayed (block 518) until the Reset Week and successor organization methods are completed as determined by the food addiction treatment method 500 (decision block 520). The user may receive emails to allow selection of foods. The food lists may be short, allowing easier selection of foods. The user also receives orientation in which specific and novel stress-reducing approaches are described. The orientation and further interactions normalize lapsing and reduce loneliness by providing forums for interaction between the user and experts and other users, and education is provided in forums, audio and/or video files, and text to relieve a major relapse trigger of self-blame. A user is presented a schedule to follow constructed with activities to restore cognitive impairment, strengthen identification with other members, and complete withdrawal from processed foods. A user is presented a checklist of activities to restore cognitive function and improve self-esteem. To activate mirror neurons, a user may engage in twice-daily video chat and daily conference calls. Instead of learning by following rigid, stressful rules, users learn through mirror neurons. An expert may be engaged via video chats, phone calls, email development, and The Facebook monitoring. Repetition of activities hour-by-hour and day-by-day effectuates Pavlovian conditioning to calm hyper-reactive pathways (pleasure/addictive and stress) and energize hypo-active pathways (cognitive). Users are further presented with education regarding how the food/media industries use tobacco-style business practices to condition addictive adaptations in the brain, cuing avoidance, and identifying media deception.

Once the Reset Week and successor organizations methods are completed, the food addiction treatment method 500 determines whether the ARC and successor organizations are further recommended (decision block 522). If neither the ARC nor the Reset Week nor successor organization methods were recommended, a book purchase system is displayed in response to activation of the link in the email (block 524).

If the ARC and successor organizations are either initially recommended or recommended after the Reset Week and successor organization methods are completed, the ARC and successor organization registration is displayed in response to activation of a link (block 526). This user registration is then received (block 528). The ARC and successor organization methods are then performed (block 532) until completion (decision block 534). This process may be performed in accordance with the ARC subroutine 700 depicted in FIG. 7. Once the ARC and successor organization programs are completed, the ARC and successor organization programs are not recommended, or the book purchase is displayed, the food addiction treatment method 500 ends (done block 530).

Reset Week and ARC may in time be replaced by or augmented with successor organizations. These successor organizations may implement analogous and improved functions within the framework of the solution disclosed herein.

Figure 6:
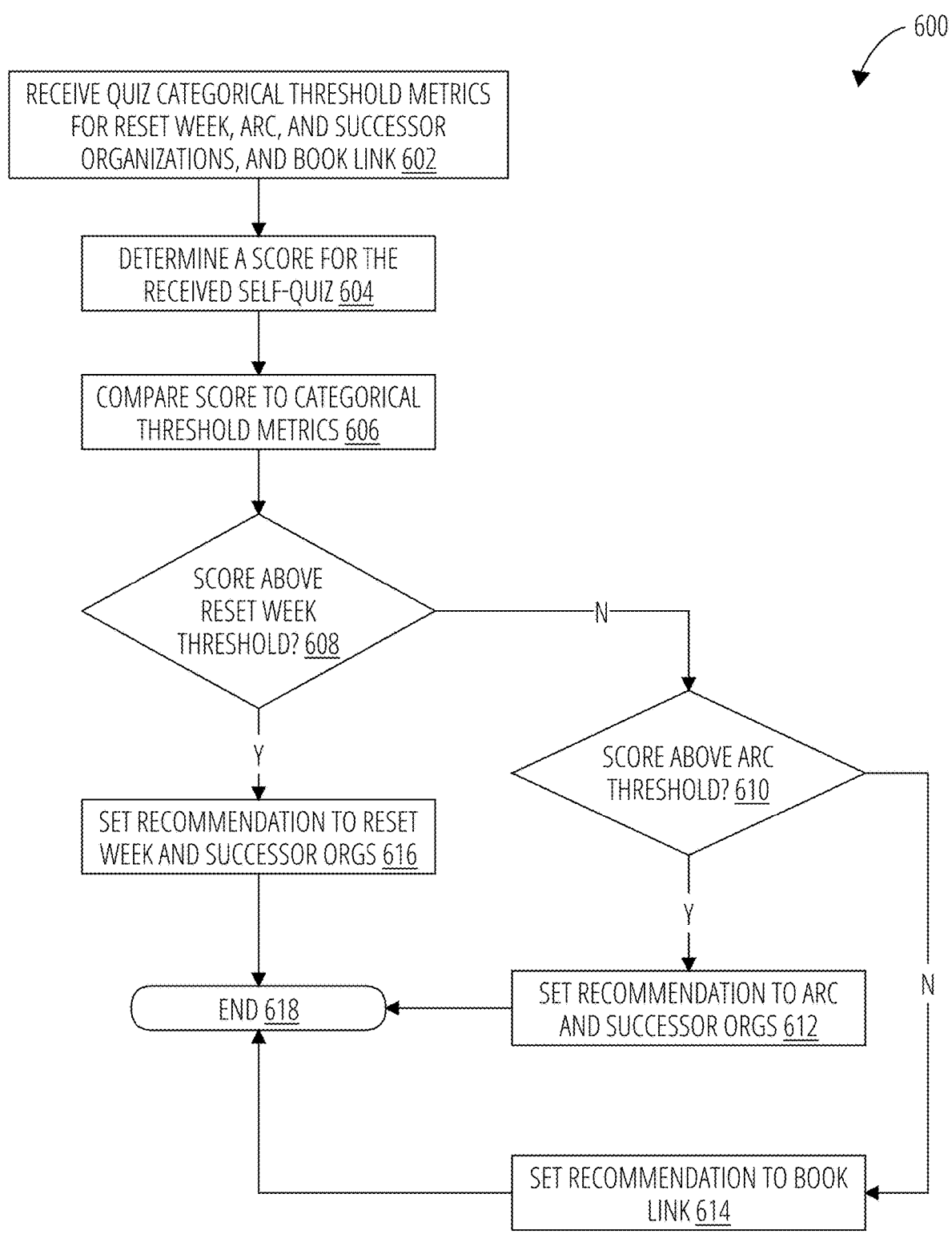
FIG. 6 illustrates a self-quiz subroutine 600 in accordance with one embodiment.

Referring to FIG. 6, a self-quiz subroutine 600 receives quiz categorical thresholds for each of the Reset Week program, the ARC program, and successor organization programs, and the book link (block 602). The thresholds may be 4 for the Reset Week and successor organization programs, 2 for the ARC and successor organization programs, and 0 for the book link, respectively, out of 10. A score is then determined from the received self-quiz (block 604). The score is compared to the categorical thresholds (block 606). The self-quiz subroutine 600 determines whether the score is above the Reset Week and successor organization threshold (decision block 608). If not, the self-quiz subroutine 600 determines whether the score is above the ARC and successor organization threshold (decision block 610). If so, the recommendation is set to the ARC successor organization programs (block 612). If not, the recommendation is set to the book link (block 614). If the score is above the Reset Week and successor organization threshold, the recommendation is set to the Reset Week and successor organization programs (block 616). Once a recommendation is set, the self-quiz subroutine 600 ends (done block 618).

Figure 7:
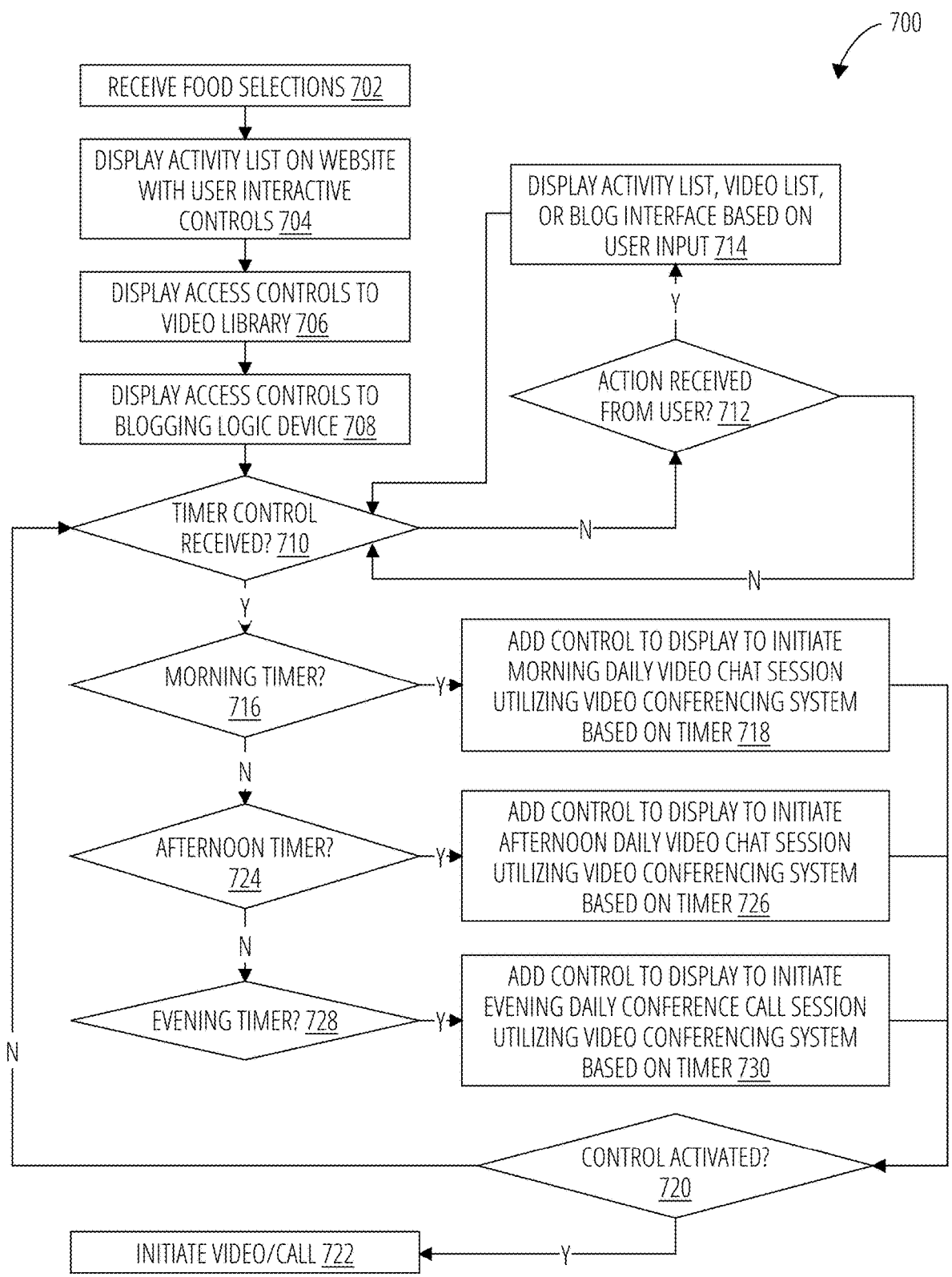
FIG. 7 illustrates an ARC subroutine 700 in accordance with one embodiment.

Referring to FIG. 7, an ARC subroutine 700 receives food selections (block 702). The user may receive emails to allow selection of foods. The food lists may be short, enabling easier selection of foods. An activity list is displayed on a website with user interactive controls (block 704), access controls to a video library are displayed (block 706), and access controls to a blogging logic device are displayed (block 708). The ARC subroutine 700 determines if a timer control is received (decision block 710). If not, the ARC subroutine 700 determines if actions, such as selections to activation controls are received (decision block 712). If so the activity list, video list, blog interface, etc. are displayed (block 714). The specific activation controls received may be influenced by the time of day, the user preferences, previously selected activation controls, etc. The user receives orientation in which specific and novel stress-reducing approaches are described. The orientation and further interactions normalize lapsing, reduce loneliness by providing forums for interaction between the user and experts and other users, and education is provided in forums, audio and/or video files, and text to relieve a major relapse trigger of self-blame. A user is present a schedule to follow constructed with activities to restore cognitive impairment, strengthen identification with other members, and complete withdrawal from processed foods. A user is presented a checklist of activities to restore cognitive function and improve self-esteem.

If a timer control is received, the ARC subroutine 700 determines whether the timer control is the morning timer (decision block 716), the afternoon timer (decision block 724), or the evening timer (decision block 728). Based on the timer control received a control is display that may be activated to access the morning daily video chat session (block 718), the afternoon daily video chat session (block 726), or the evening daily conference call session (block 730). To activate mirror neurons, a user may engage in twice-daily video chat and daily conference call. Instead of learning by following rigid, stressful rules, users learn through mirror neurons.

If the control is activated (decision block 720), the associated call is initiated by the client device (block 722). An expert may be engaged via video chats, phone calls, email development, and The Facebook monitoring. Repetition of activities hour-by-hour and day-by-day effectuates Pavlovian conditioning to calm hyper-reactive pathways (pleasure/addictive and stress) and energize hypo-active pathways (cognitive). Users are further presented education regarding how the food/media industries use tobacco-style business practices to condition addictive adaptations in the brain, cue avoidance, and identifying media deception.

Figure 8:
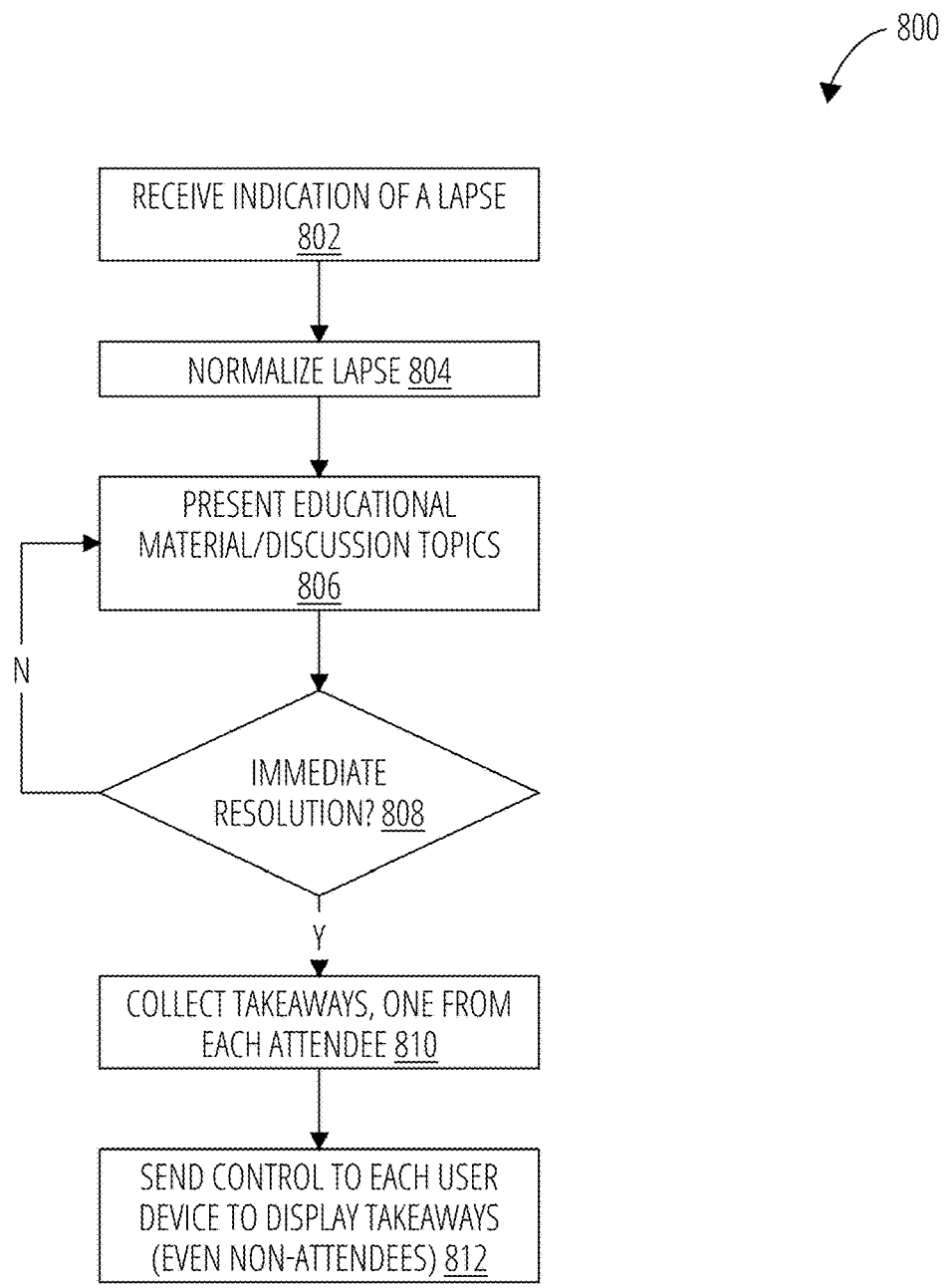
FIG. 8 illustrates a lapse normalization method 800 in accordance with one embodiment.

Referring to FIG. 8, an indication of a lapse is received (block 802). A user may report the lapse. The reporting may occur during an audio call or a video conference call. Other activity associated with a lapse may also be determined, such as activation of activation controls previously associated with a lapse. The lapse is then normalized (block 804). Educational material and discussion topics may then be presented (block 806). This may include connecting to an expert utilizing a blogging logic or audio/video conferencing system. The normalization process may also include influencing the display on a website to increase the probability and/or prominence of educational material, activities, stored videos, etc. to normalize the lapse. For example, a video associated with an activity performed previously that resulted in a discontinuation of the lapse may be displayed at the top of the list of displayed activities. Also, video and audio files associated with previous lapses may receive a greater weight for placement at the top of the list. The recommendation may be based on the specific user or group of user, such as an identified tribe. The lapse normalization method 800 determines whether resolution of the lapse has occurred (decision block 808). If not, the educational material and discussion topics are presented. Once resolved, takeaways are then collected (block 810). The takeaways may be collected one from each attendee, if in a meeting. The takeaways may be recorded audio files, video files, text, etc. A control is then sent to each user at a client device to display the takeaways (block 812). The activation control may be to display a video, play an audio file, display text in an email, etc.

Referring to FIG. 9-FIG. 16, displays of a client device in various states as configured by the control system are depicted.

Figure 9:
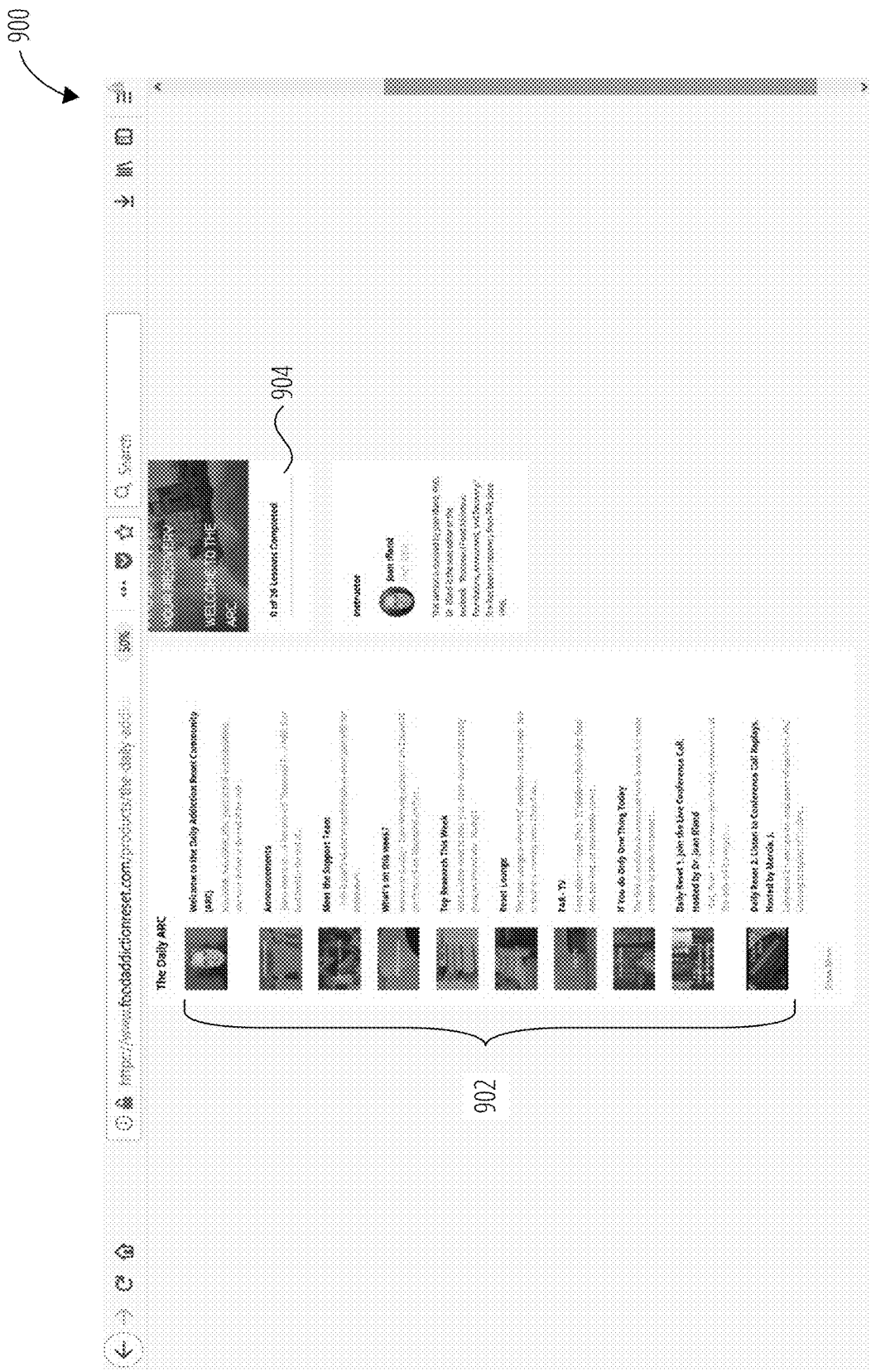
FIG. 9 illustrates a display 900 in accordance with one embodiment.

FIG. 9 illustrates a display 900 in accordance with one embodiment. The activation controls 902 may be displayed. The activation controls 902 may be arranged based on influences, including time of day, user lapsing, and previous user activation of such activation controls 902. The activation controls 902 may include images and text associated with the content to be activated by the selection of the activation controls 902. Additionally, a tracking control 904 may be displayed to depict the progress made by a user.

Figure 10:
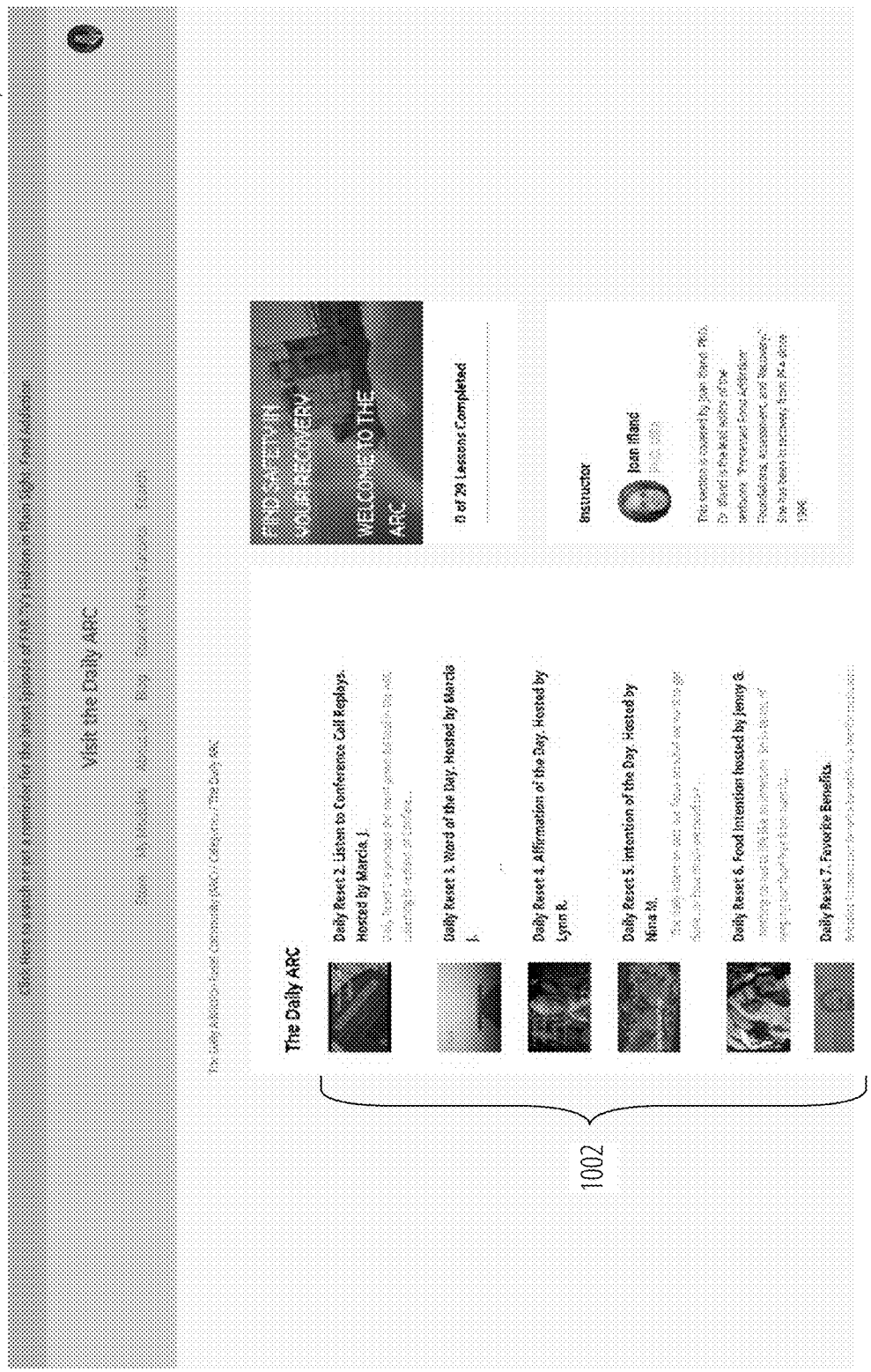
FIG. 10 illustrates a display 1000 in accordance with one embodiment.

FIG. 10 illustrates a display 1000 in accordance with one embodiment. The activation controls 902 introduced with respect to FIG. 9 may include the list of activity controls 1002. The list of activity controls 1002 may be associated with activities that may be performed by the user when selected.

Figure 11:
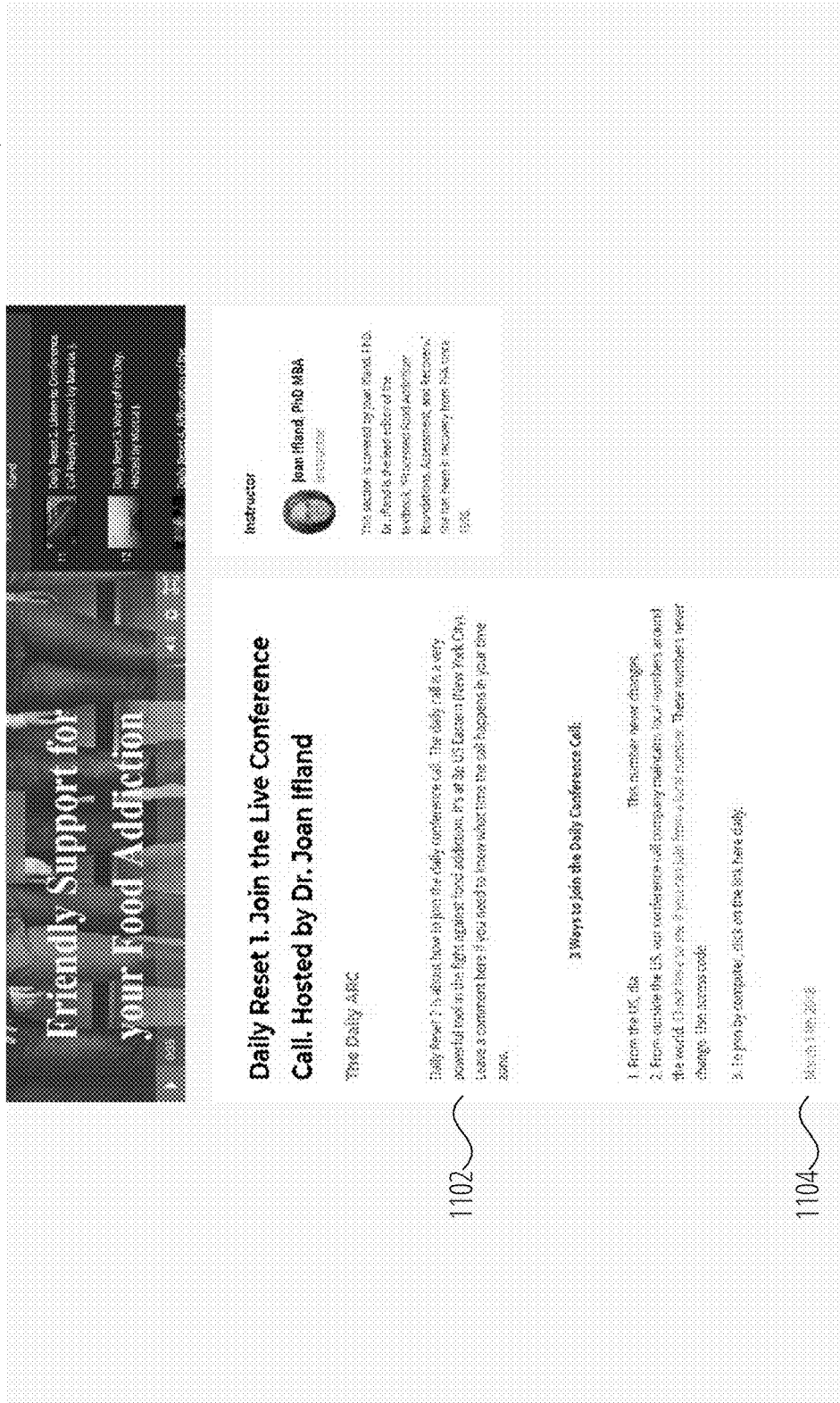
FIG. 11 illustrates a display 1100 in accordance with one embodiment.

FIG. 11 illustrates a display 1100 in accordance with one embodiment. The selection of one of the activation controls 902 of FIG. 9 may operate the client device to display a text display 1102 and a call activation control 1104. The text display 1102 may inform the user of the activation controls 902 selected, and the call activation control 1104 is a further activation control to alter the operation of the client device. Here, specifically, the client device may be altered to operate and communicate with an audio/video conferencing system. The call activation control 1104 may be altered based on a timer to communicate with a different audio/video call.

Figure 12:
FIG. 12 illustrates a display 1200 in accordance with one embodiment.

FIG. 12 illustrates a display 1200 in accordance with one embodiment. Each call activated by the call activation control 1104 of FIG. 11 may then be stored and a stored video activation control 1202 provided to access the stored audio or video call. The arrangement of the stored video activation control 1202 may be chronological or may be influenced by user preferences or user selection of activation controls. For example, a stored video activation control 1202 associated with a video in which a previous lapse was normalized and resolved may receive a greater list weight and may be more likely to be displayed at the top of the list of the stored video activation control 1202, or more prominently. Text and images may be displayed in association with each stored video activation control 1202.

Figure 13:
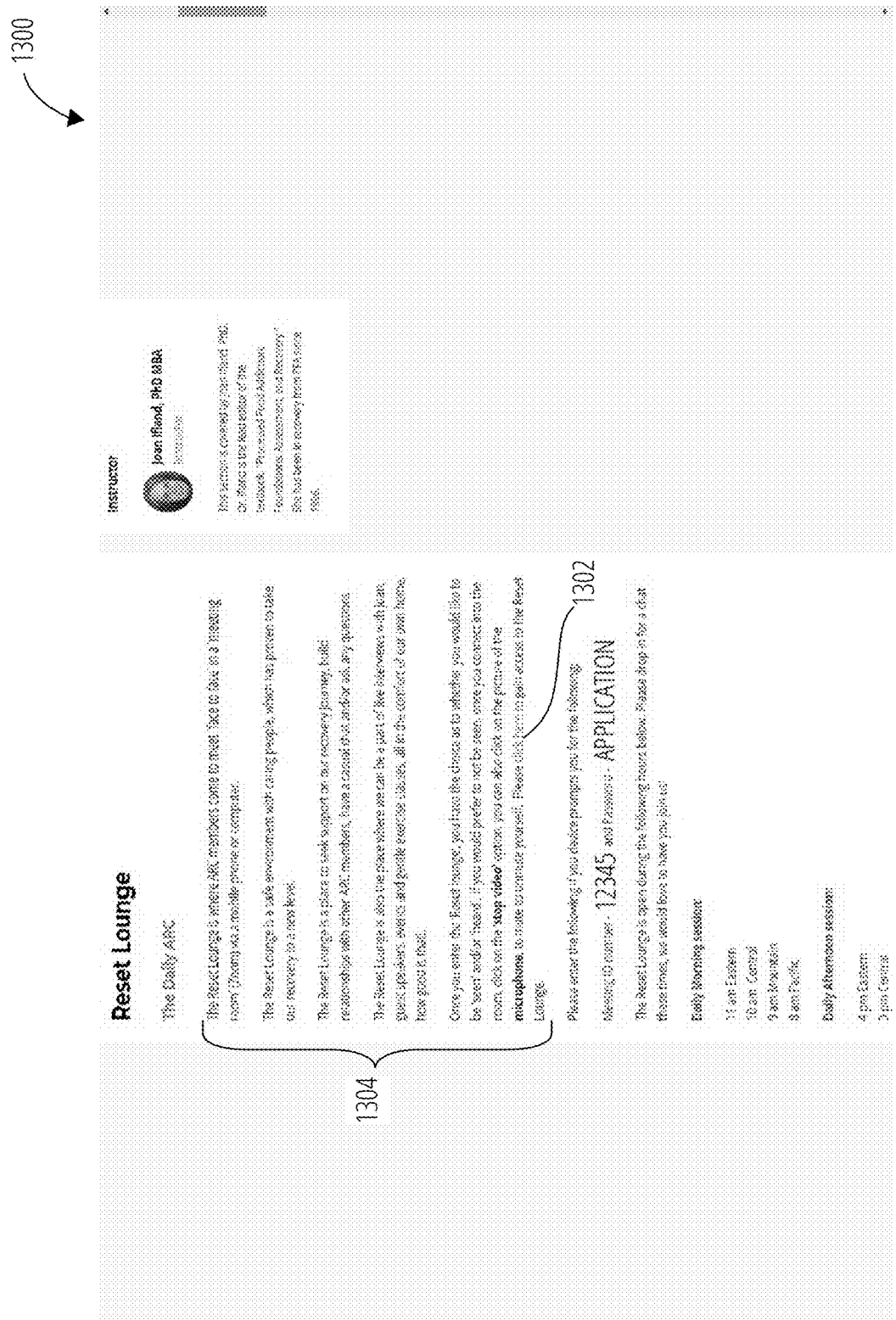
FIG. 13 illustrates a display 1300 in accordance with one embodiment.

FIG. 13 illustrates a display 1300 in accordance with one embodiment. In such an embodiment, an audio conference activation control 1302 with associated configured text 1304 may be displayed to operate the client device to access an audio or video call.

Figure 14:
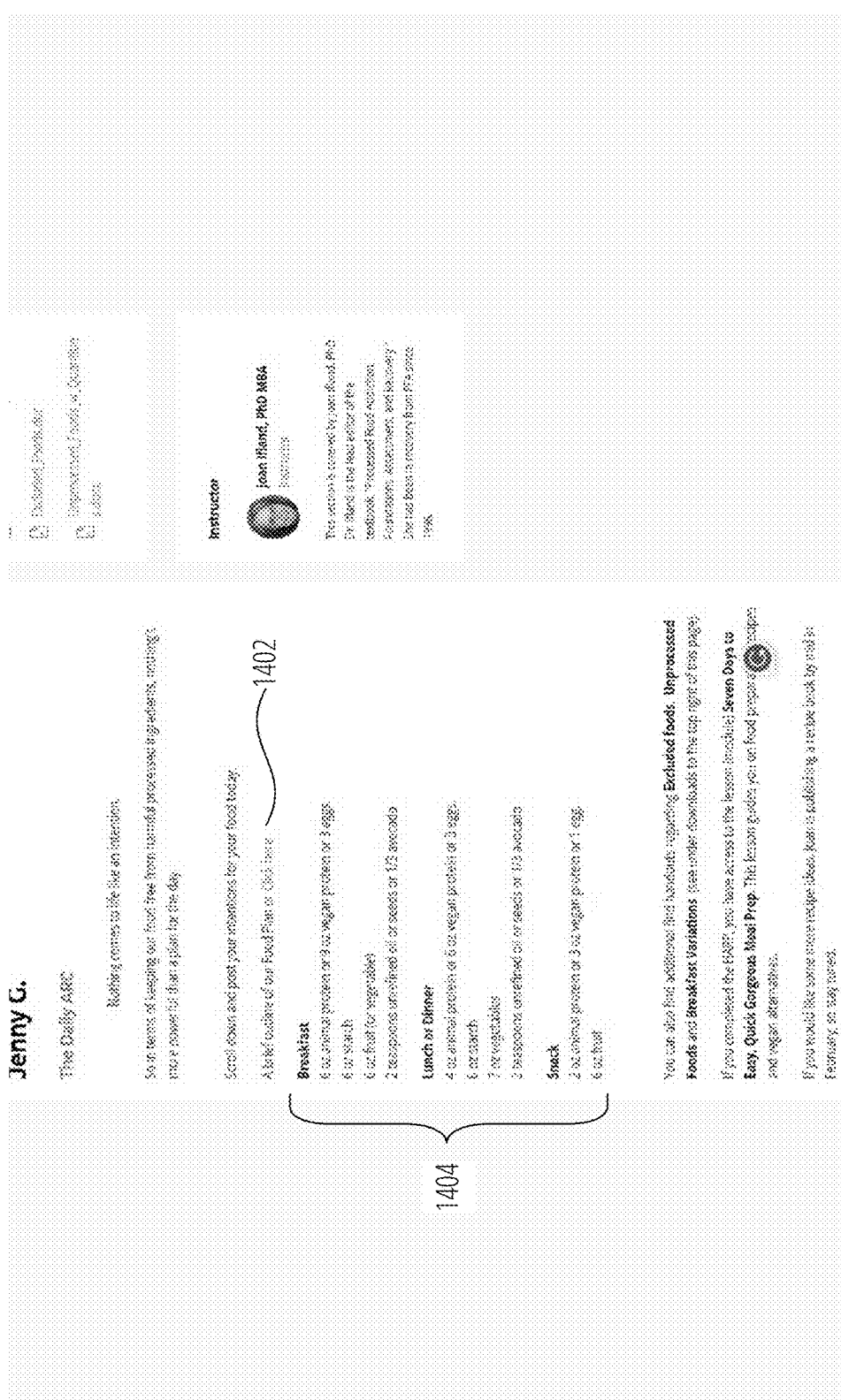
FIG. 14 illustrates a display 1400 in accordance with one embodiment.

FIG. 14 illustrates a display 1400 in accordance with one embodiment. Other activation controls 902 may operate the client device to display a food plan activator 1402 and a food list text 1404. The food plan activator 1402 may further operate the client device to receive inputs regarding a user's selected food choices. The food list text 1404 may display a list of foods. The list of foods may be influenced by the user associated with the client device, for example, by a selection made when operating the food plan activator 1402. The food list text 1404 may also be influenced by the time of day, activation of specific activation controls, etc.

Figure 15:
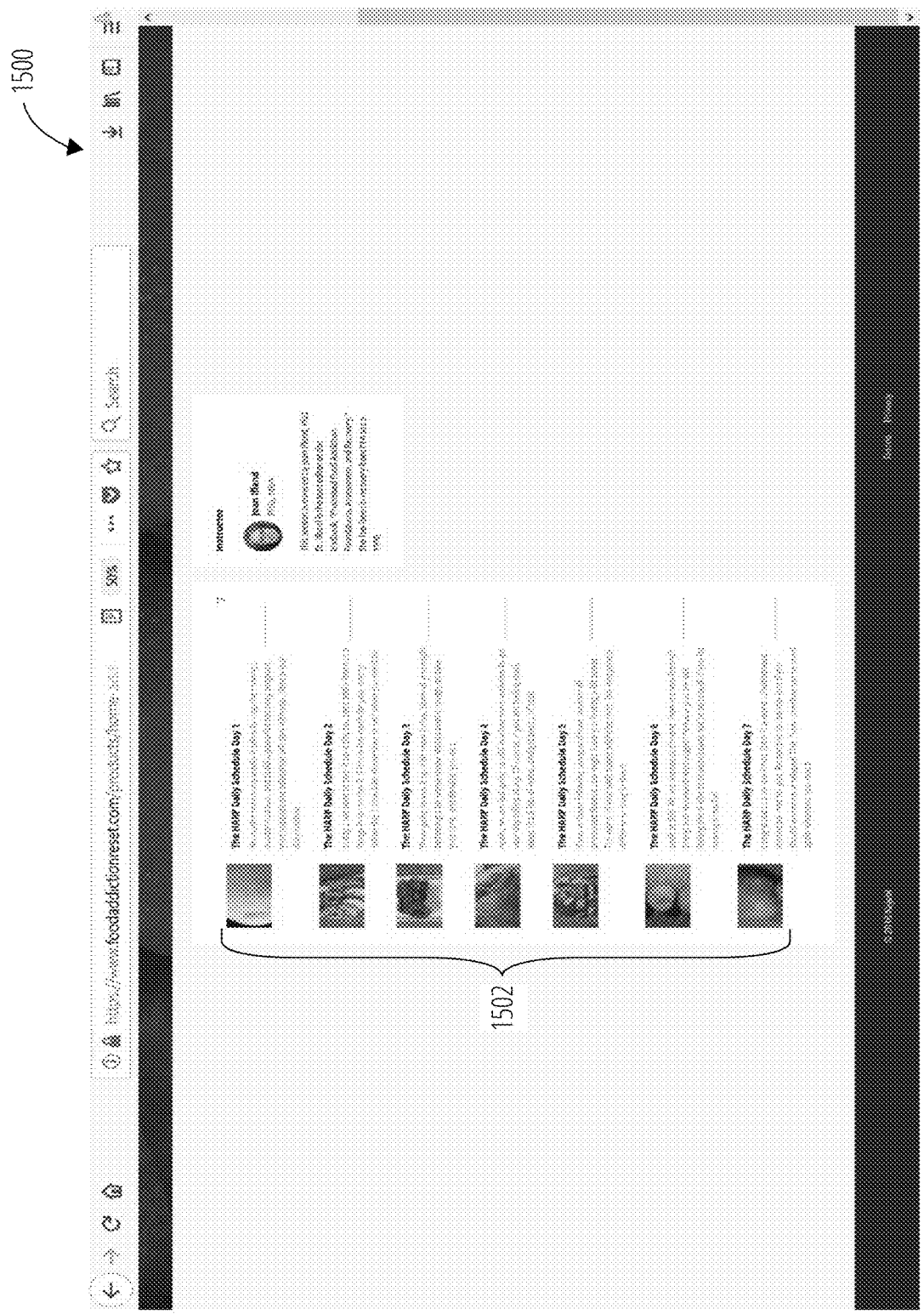
FIG. 15 illustrates a display 1500 in accordance with one embodiment.

FIG. 15 illustrates a display 1500 in accordance with one embodiment. A client device associated with a user in the Reset Week and successor organization programs may have a display of daily schedule controls 1502.

Figure 16:
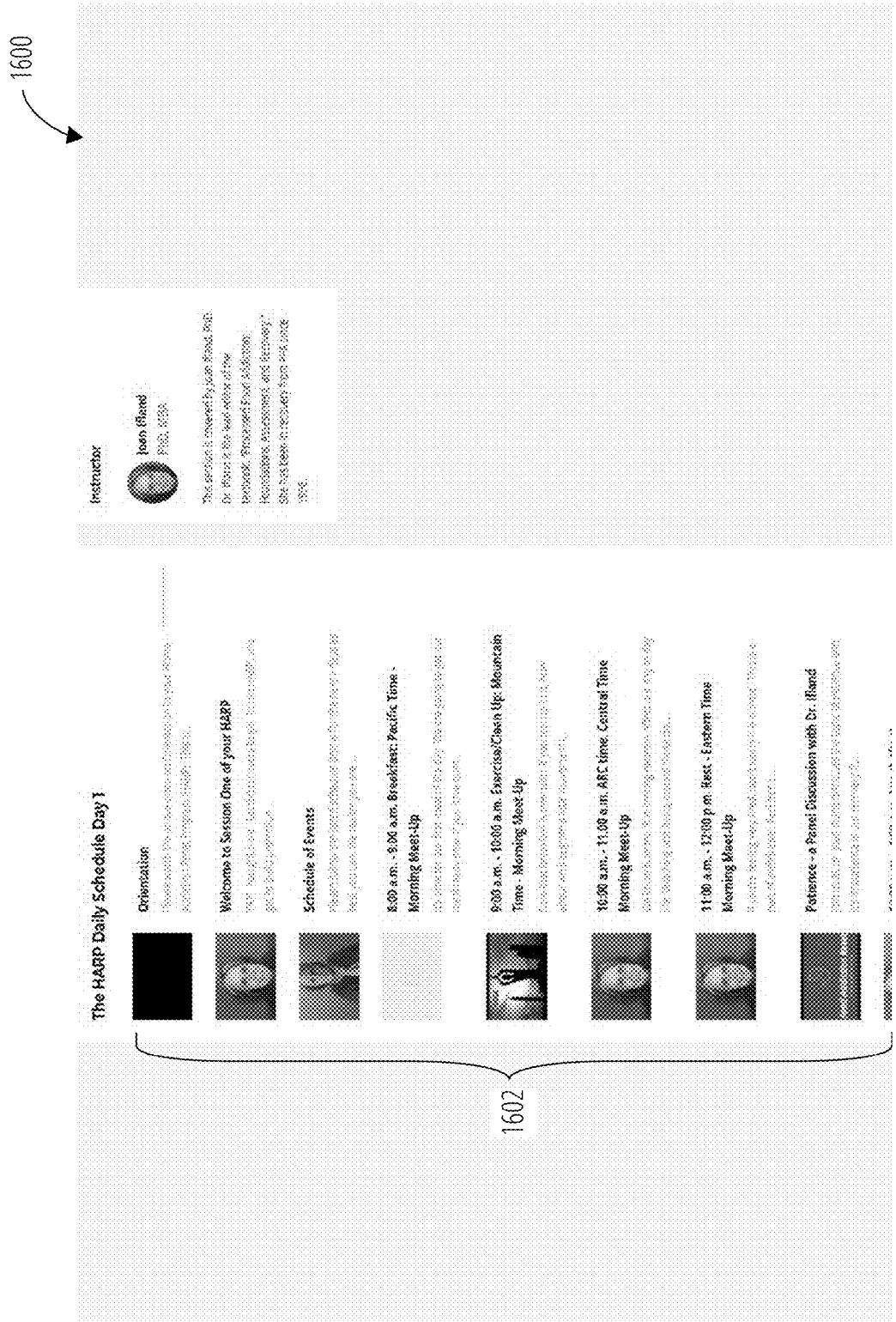
FIG. 16 illustrates a display 1600 in accordance with one embodiment.

FIG. 16 illustrates a display 1600 in accordance with one embodiment. Each of the daily schedule controls 1502 introduced in FIG. 15 may have associated text and images, as well as operating the client device to display the hourly activation controls 1602 when selected. The hourly activation controls 1602 may be selected to display an associated activity, food list, call activation control, etc. The Reset Week and successor organization programs may operate to minimize the user preference influences and provide more weight to time-based influences to configure the client device to maximize the effect of the activities on the user during a determined withdrawal period of time.

Figure 17:
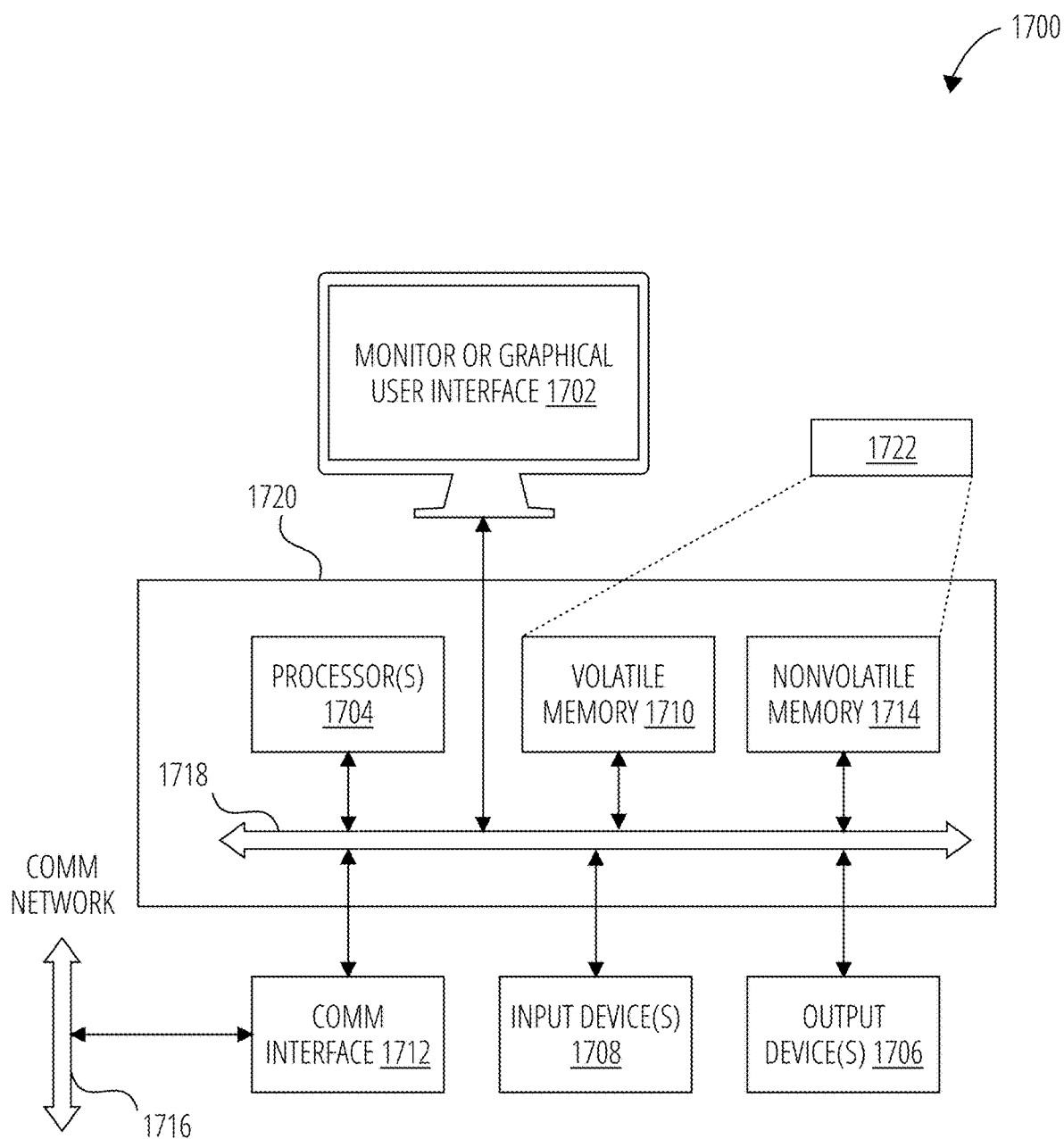
FIG. 17 illustrates a computing device 1700 in accordance with one embodiment.

FIG. 17 is an example block diagram of a computing device 1700 that may incorporate embodiments of the present disclosure. The client devices 104a-104n, the server system 110, portions of the email system 408 and audio/video conferencing system 410, and other computational systems described above, for example, may incorporate some or all of the elements of computing device 1700 as described here. FIG. 17 is merely illustrative of a machine system to carry out aspects of the technical processes described herein and does not limit the scope of the claims. One of ordinary skill in the art would recognize other variations, modifications, and alternatives. In one embodiment, the computing device 1700 typically includes a monitor or graphical user interface 1702, a data processing system 1720, a communication network interface 1712, input device(s) 1708, output device(s) 1706, and the like.

As depicted in FIG. 17, the data processing system 1720 may include one or more processor(s) 1704 that communicate with a number of peripheral devices via a bus subsystem 1718. These peripheral devices may include input device(s) 1708, output device(s) 1706, communication network interface 1712, and a storage subsystem, such as a volatile memory 1710 and a nonvolatile memory 1714.

The volatile memory 1710 and/or the nonvolatile memory 1714 may store computer-executable instructions and thus forming logic 1722 that when applied to and executed by the processor(s) 1704 implement embodiments of the processes disclosed herein.

The input device(s) 1708 include devices and mechanisms for inputting information to the data processing system 1720. These may include a keyboard, a keypad, a touch screen incorporated into the monitor or graphical user interface 1702, audio input devices such as voice recognition systems, microphones, and other types of input devices. In various embodiments, the input device(s) 1708 may be embodied as a computer mouse, a trackball, a track pad, a joystick, wireless remote, drawing tablet, voice command system, eye tracking system, and the like. The input device(s) 1708 typically allow a user to select objects, icons, control areas, text and the like that appear on the monitor or graphical user interface 1702 via a command such as a click of a button or the like.

The output device(s) 1706 include devices and mechanisms for outputting information from the data processing system 1720. These may include the monitor or graphical user interface 1702, speakers, printers, infrared light emitting diodes (LEDs), and so on as well understood in the art.

The communication network interface 1712 provides an interface to communication networks (e.g., communication network 1716) and devices external to the data processing system 1720. The communication network interface 1712 may serve as an interface for receiving data from and transmitting data to other systems. Embodiments of the communication network interface 1712 may include an Ethernet interface, a modem (telephone, satellite, cable, Integrated Services Digital Network or ISDN), (asynchronous) digital subscriber line (DSL), FireWire, USB, a wireless communication interface such as BlueTooth or WiFi, a near field communication wireless interface, a cellular interface, and the like.

The communication network interface 1712 may be coupled to the communication network 1716 via an antenna, a cable, or the like. In some embodiments, the communication network interface 1712 may be physically integrated on a circuit board of the data processing system 1720, or in some cases may be implemented in software or firmware, such as "soft modems", or the like.

The computing device 1700 may include logic that supports communications over a network using protocols such as HTTP, TCP/IP, RTP/RTSP, IPX, UDP and the like.

The volatile memory 1710 and the nonvolatile memory 1714 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1710 and the nonvolatile memory 1714 may be configured to store the basic programming and data constructs that provide the functionality of the disclosed processes and other embodiments thereof that fall within the scope of the present disclosure.

Logic 1722 that implements embodiments of the present disclosure may be stored in the volatile memory 1710 and/or the nonvolatile memory 1714. Said logic 1722 may be read from the volatile memory 1710 and/or nonvolatile memory 1714 and executed by the processor(s) 1704. The volatile memory 1710 and the nonvolatile memory 1714 may also provide a repository for storing data used by the logic 1722.

The volatile memory 1710 and the nonvolatile memory 1714 may include a number of memories including a main random access memory (RAM) for storage of instructions and data during program execution and a read only memory (ROM) in which read-only non-transitory instructions are stored. The volatile memory 1710 and the nonvolatile memory 1714 may include a file storage subsystem providing persistent (non-volatile) storage for program and data files. The volatile memory 1710 and the nonvolatile memory 1714 may include removable storage systems, such as removable flash memory.

The bus subsystem 1718 provides a mechanism for enabling the various components and subsystems of data processing system 1720 to communicate with each other as intended. Although the communication network interface 1712 is depicted schematically as a single bus, some embodiments of the bus subsystem 1718 may utilize multiple distinct buses.

It will be readily apparent to one of ordinary skill in the art that the computing device 1700 may be a device such as a smartphone, a desktop computer, a laptop computer, a rack-mounted computer system, a computer server, or a tablet computer device. As commonly known in the art, the computing device 1700 may be implemented as a collection of multiple networked computing devices. Further, the computing device 1700 will typically include operating system logic (not illustrated) the types and nature of which are well-known in the art.

IMPLEMENTATION AND INTERPRETATION

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Clock" in this context refers to a circuit that generates a periodic signal, with a rate typically measured in cycles per second (measured in hertz, kilohertz, megahertz or gigahertz), to drive the operation of a synchronous circuit. A typical digital clock cycle toggles between a logical zero and a logical one state.

"Controller" in this context refers to logic, collection of logic, or circuit that coordinates and controls the operation of one or more input/output devices and synchronizes the operation of such devices with the operation of the system as a whole. For example, the controller may operate as a component or a set of virtual storage processes that schedules or manages shared resources. For example, IF (controller. logic {device1|device2|device3} {get.data( ), process.data( ), store.data( )}), -device1 get.data(input1)→data.input1; -device2 process.data(data.input1)→formatted.data1→-device3 store.data(formatted.data1).

"Correlator" in this context refers to a logic element that identifies a configured association between its inputs. One example of a correlator is a lookup table (LUT) configured in software or firmware. Correlators may be implemented as relational databases. An example LUT correlator is: |low_alarm_condition |low_threshold_value| 0||safe_condition-|safe_lower_bound|safe_upper_bound||high_alarm_condition|high_threshold_value| 0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Parser" in this context refers to logic that divides an amalgamated input sequence or structure into multiple individual elements. Example hardware parsers are packet header parsers in network routers and switches. An example software or firmware parser is: aFields=split("val1, val2, val3", ","); Another example of a software or firmware parser is: readFromSensor gpsCoordinate; x_pos=gpsCoordinate.x; y_pos=gpsCoordinate.y; z_pos=gpsCoordinate.z; Other examples of parsers will be readily apparent to those of skill in the art, without undo experimentation.

"Selector" in this context refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Sequencer" in this context refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++; Other examples of hardware and software or firmware sequencers will now be readily apparent to those of skill in the relevant arts.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A system comprising:
a receiver to receive a set of user influences; and
a control system comprising:
a processor; and
a memory storing instructions that, when executed by the processor, configure the control system to:
prioritize a group of activation controls based on the set of user influences;
send the group of activation controls to a client device to be displayed, each of the activation controls able to receive a first input from a user, wherein each of the activation controls is associated with a user-selectable content;
display the group of activation controls;
receive the first input from the user to initiate the activation control to select the user-selectable content;
detect patterns in initiation of the activation controls, wherein the patterns include:
selection of certain activation controls;
lapse data; and
specific activities;
provide the detected patterns as feedback to the control system to at least one of refine, simplify, streamline, and reduce an amount of data transferred to provide the user-selectable content to the user; and
prioritize future groups of activation controls based on the feedback.

2. The system of claim 1, wherein the group of activation controls includes at least one of a control to display a list of activities, a control to display a food list, and a control to display further activation controls.

3. The system of claim 1, the group of activation controls further able to receive a second input to operate a video conferencing system on the client device.

4. The system of claim 1, further comprising a timer to determine a time, the control system utilizing the time to further prioritize the group of activation controls.

5. The system of claim 4, wherein the group of activation controls includes a control to operate a video conferencing system, the control system deactivating the control to operate the video conferencing system based on the time provided by the timer.

6. The system of claim 3, further comprising a user preference control memory structure to store instances of the first input and the second input.

7. A method comprising:

receiving a set of user influences to a receiver;

prioritizing a group of activation controls based on the set of user influences using a control system;

sending the group of activation controls to a client device to be displayed, each of the activation controls able to receive a first input from a user, wherein each of the activation controls is associated with a user-selectable content;

displaying the group of activation controls;

receiving the first input from the user to initiate the activation control to select the user-selectable content;

detecting patterns in initiation of the activation controls, wherein the patterns include:
- selection of certain activation controls;
- lapse data; and
- specific activities;

providing the detected patterns as feedback to the control system to at least one of refine, simplify, streamline, and reduce an amount of data transferred to provide the user-selectable content to the user; and prioritizing future groups of activation controls based on the feedback.

\* \* \* \* \*